(12) United States Patent
Kuchenski et al.

(10) Patent No.: US 11,605,072 B2
(45) Date of Patent: Mar. 14, 2023

(54) MODULAR AUTOMATED TRANSACTION MACHINE

(71) Applicant: Diebold Nixdorf, Incorporated, North Canton, OH (US)

(72) Inventors: David Kuchenski, Uniontown, OH (US); Richard Harris, North Canton, OH (US)

(73) Assignee: Diebold Nixdorf Incorporated, Hudson, OH (US)

( * ) Notice: Subject to any disclaimer, the term of this patent is extended or adjusted under 35 U.S.C. 154(b) by 533 days.

(21) Appl. No.: 16/855,406

(22) Filed: Apr. 22, 2020

(65) Prior Publication Data

US 2020/0318415 A1 Oct. 8, 2020

Related U.S. Application Data

(63) Continuation-in-part of application No. PCT/US2018/057167, filed on Oct. 23, 2018.
(Continued)

(51) Int. Cl.
*G07D 11/40* (2019.01)
*G07D 11/60* (2019.01)
(Continued)

(52) U.S. Cl.
CPC .......... *G06Q 20/383* (2013.01); *E05G 1/024* (2013.01); *G06K 7/10297* (2013.01);
(Continued)

(58) Field of Classification Search
CPC .. G06Q 20/383; G06Q 20/1085; E05G 1/024; G06K 7/10297; G07D 11/40;
(Continued)

(56) References Cited

U.S. PATENT DOCUMENTS 6,293,450 B1 * 9/2001 Aron .......................... B62J 9/27
224/430
7,967,492 B2 * 6/2011 Nagasawa ............ G02B 5/0242
362/606
(Continued)

FOREIGN PATENT DOCUMENTS

EP          1926058 A2    5/2008
WO    2007036915 A2    4/2007

OTHER PUBLICATIONS

Diebold Nixdorf: "Diebold Nixdorf Expands Offerings Beyond Omnichannel, Reveals Connected Commerce Future at Money 20/20". Oct. 17, 2017, XP055552152, Retrieved from the Internet: URL: https://www.prnewswire.com/news-releases/diebold-nixdorf-expands-offerings-beyond-omnichannel-reveals-connected-commerce-future-at-money2020-300537845.html [retrieved on Feb. 5, 2019]; the whole document.

(Continued)

*Primary Examiner* — Tuyen K Vo
(74) *Attorney, Agent, or Firm* — Black McCuskey

(57) ABSTRACT

A modular ATM can include a cabinet module and a head module. The cabinet module can include an outer housing, a chest positioned in the outer housing to store notes of value, a transport mechanism to move the notes of value out of the chest, a base receiving section, and a first electrical connector forming an electrical connection to the transport mechanism. The head module can be removably engageable with the cabinet module and include a computing device, at least one user-interface device controlled by the computing device, a main structure supporting the at least one user-interface device and the computing device, a rear shroud connected to the main structure, a base supporting the main structure and the rear shroud, and a second electrical con- (Continued)

nector mounted in the base and forming an electrical connection to the computing device.

20 Claims, 32 Drawing Sheets

Related U.S. Application Data

(60) Provisional application No. 62/576,055, filed on Oct. 23, 2017.

(51) Int. Cl.
*G06Q 20/38* (2012.01)
*G06K 7/10* (2006.01)
*G06Q 20/10* (2012.01)
*H02J 7/00* (2006.01)
*E05G 1/024* (2006.01)
*G07F 19/00* (2006.01)
*G07F 17/12* (2006.01)

(52) U.S. Cl.
CPC ......... *G06Q 20/1085* (2013.01); *G07D 11/40* (2019.01); *G07D 11/60* (2019.01); *G07F 17/12* (2013.01); *G07F 17/13* (2020.05); *G07F 19/201* (2013.01); *G07F 19/208* (2013.01); *H02J 7/0042* (2013.01); *G07F 19/205* (2013.01)

(58) Field of Classification Search
CPC ......... G07D 11/60; G07F 17/12; G07F 17/13; G07F 19/201; G07F 19/208; G07F 19/205; G07F 19/206; H02J 7/0042
See application file for complete search history.

(56) References Cited

U.S. PATENT DOCUMENTS

| | | | |
|---|---|---|---|
| 8,998,078 B2* | 4/2015 | Lute | H05K 7/14 |
| | | | 902/8 |
| 10,096,212 B1 | 10/2018 | Lee | |
| 2002/0000913 A1 | 1/2002 | Hamamoto | |
| 2004/0149818 A1 | 8/2004 | Shepley | |
| 2005/0109832 A1 | 5/2005 | Izawa | |
| 2005/0269397 A1* | 12/2005 | Shepley | G07F 19/205 |
| | | | 235/379 |
| 2012/0001524 A1 | 1/2012 | Shih | |
| 2012/0145782 A1 | 6/2012 | Ma | |
| 2016/0300205 A1 | 10/2016 | Lute | |

OTHER PUBLICATIONS

Anonymous: "Santo Tirso Lamassu", Nov. 15, 2016, XP055552129, Retrieved from the Internet: URL: https://web.archive.org/web/20161115030956/https://lamassu.is/product/santo-tirso/ {retreived on Feb. 5, 2019] the whole document.

Author: International Searching Authority, Patent Cooperation Treaty; Title: International Search Report; dated Feb. 20, 2019 All pages; International application No. PCT/US2018/057167 (corresponding to the present application).

Author: International Searching Authority, Patent Cooperation Treaty; Title: Written Opinion of the International Searching Authority; dated Feb. 20, 2019 All pages; International application No. PCT/US2018/057167 (corresponding to the present application).

Author: International Searching Authority, Patent Cooperation Treaty; Title: Written Opinion of the International Searching Authority; dated Oct. 30, 2019; All pages; International application No. PCTUS2019/042691 (also corresponding to the present application).

Author: International Searching Authority, Patent Cooperation Treaty; Title: International Search Report; dated Mar. 7, 2019; All pages; International application No. PCT/US2018/057027 (also corresponding to the present application).

The Hivemq Team: "MQTT Essentials Part 3: Client, Broker and Connection Establishment", Jan. 26, 2015, XP0555560454, Retrieved from the Internet: URL: https://hivemq.com/blog/mqtt-essentials-part-3-client-broker-connections-establishment/ [retrieved on Feb. 21, 2019] the whole document.

Author: International Searching Authority, Patent Cooperation Treaty; Title: Written Opinion of the International Searching Authority; dated Oct. 23, 2018; All pages; International application No. PCT/US2018/057021 (also corresponding to the present application).

Author: International Searching Authority, Patent Cooperation Treaty; Title: International Search Report dated Oct. 30, 2019; All pages; International application No. PCTUS2019/042691 corresponding to the present application).

* cited by examiner

MODULAR AUTOMATED TRANSACTION MACHINE

CROSS-REFERENCE TO RELATED APPLICATIONS

This application claims priority to and the benefit of U.S. Provisional Patent Application 62/576,055, filed on Oct. 23, 2017, the contents of which are hereby incorporated by reference in their entirety. In addition, this is a bypass application of PCT/US18/057167, filed Oct. 23, 2018.

BACKGROUND

1. Field

The present disclosure relates to automated transaction machines (or "automatic teller machines"), as found in the International Patent Classification and Cooperative Patent Classification G07F19/00.

2. Description of Related Prior Art

Automated transaction machines (hereafter ATMs) are commonly used to carry out a variety of financial or commercial transactions. Most commonly, these transactions include dispensing cash, checking account balances, paying bills and/or receiving deposits from users. ATMs may also perform a variety of other transactions, including the sale and purchase of tickets, issuance of coupons, check or voucher presentation, the printing of script and a variety of other functions. For carrying out these transactions or performing these functions, ATMs typically include a variety of components and these components are chosen based upon what is necessary to include for the particular design and build of a particular production line or model of machine.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A modular ATM can include a cabinet module and a head module. The cabinet module can include an outer housing. The cabinet module can also include a chest positioned in the outer housing and configured to store notes of value. The cabinet module can also include a transport mechanism positioned in the outer housing. The transport mechanism can be engaged with the chest to move the notes of value out of the chest and direct the notes of value away from the chest. The cabinet module can also include a base receiving section defined by a plurality of exterior surfaces of the outer housing. The cabinet module can also include a first electrical connector mounted in the base receiving section and forming an electrical connection to the transport mechanism. The head module can be removably engageable with the cabinet module. The head module can include a computing device having one or more processors. The head module can also include at least one user-interface device controlled by the computing device. The head module can also include a main structure supporting the at least one user-interface device and the computing device. The head module can also include a rear shroud connected to the main structure to enclose a rear side of the at least one user-interface device and the computing device. The head module can also include a base supporting the main structure and the rear shroud. The head module can also include a second electrical connector mounted in the base and forming an electrical connection to the computing device. When the head module is engaged with the cabinet module, the base of the head module can be positioned in the base receiving section between a first and second of the plurality of exterior surfaces that are parallel to one another. Also, when the head module is engaged with the cabinet module, the first electrical connector and the second electrical connector are interconnected whereby an electrical connection is established between the computing device and the transport mechanism.

BRIEF DESCRIPTION OF THE DRAWINGS

The detailed description set forth below references the following drawings.

DETAILED DESCRIPTION

Figure 1:
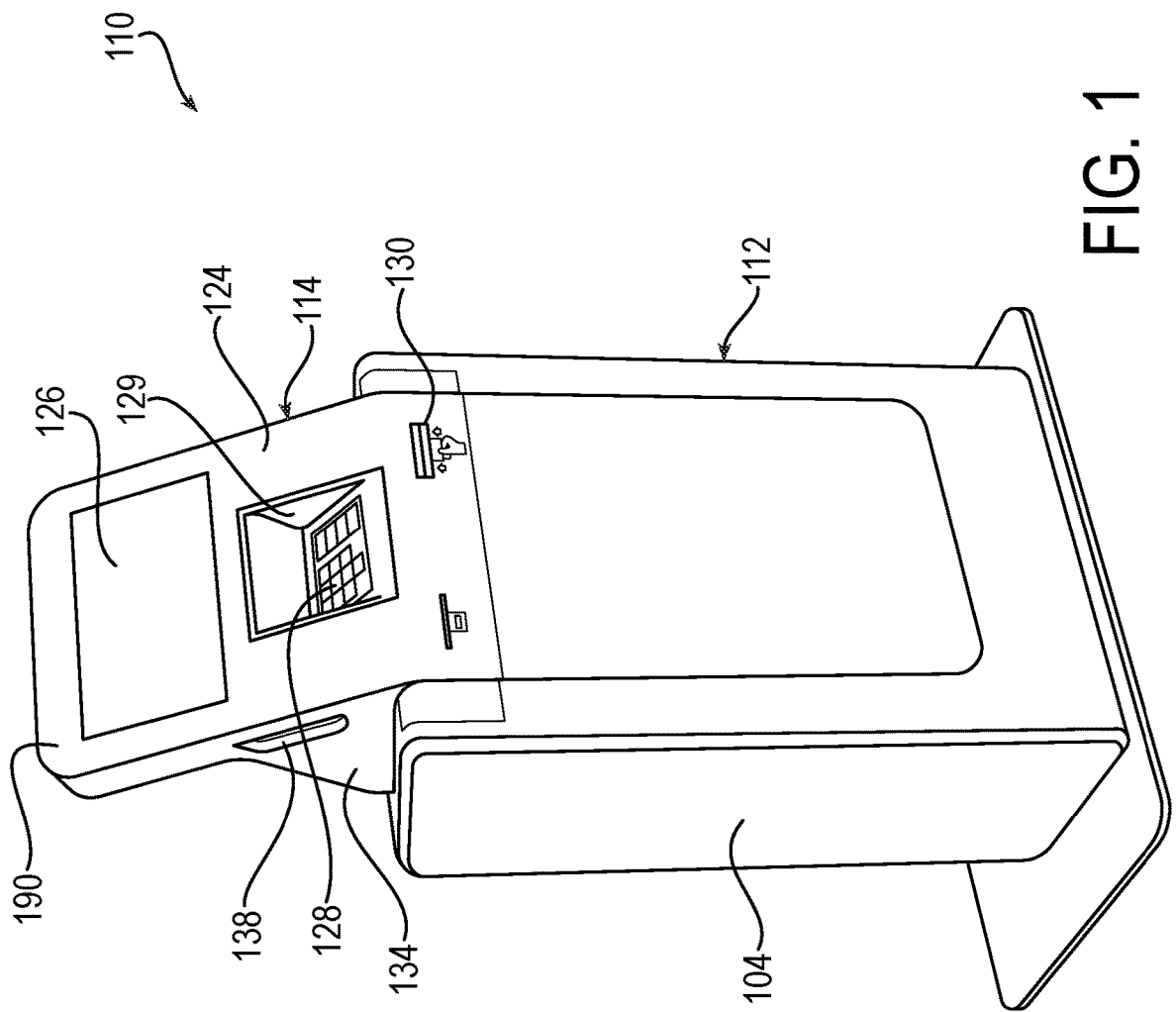
FIG. 1 is a perspective view of a first embodiment of a modular ATM according to the present disclosure.
Figure 2:
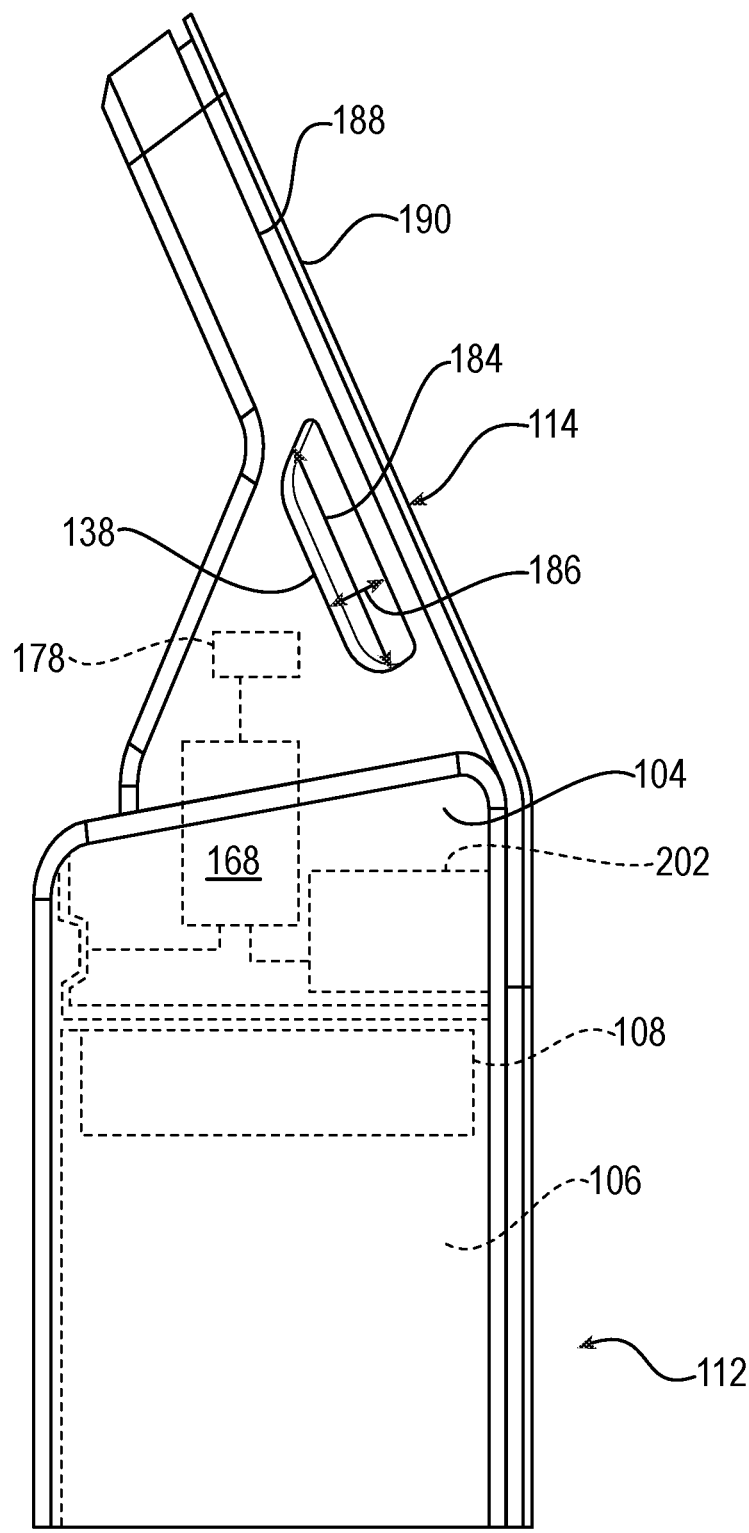
FIG. 2 is a left-side view of the first configuration of the first embodiment of the present disclosure.
Figure 3:
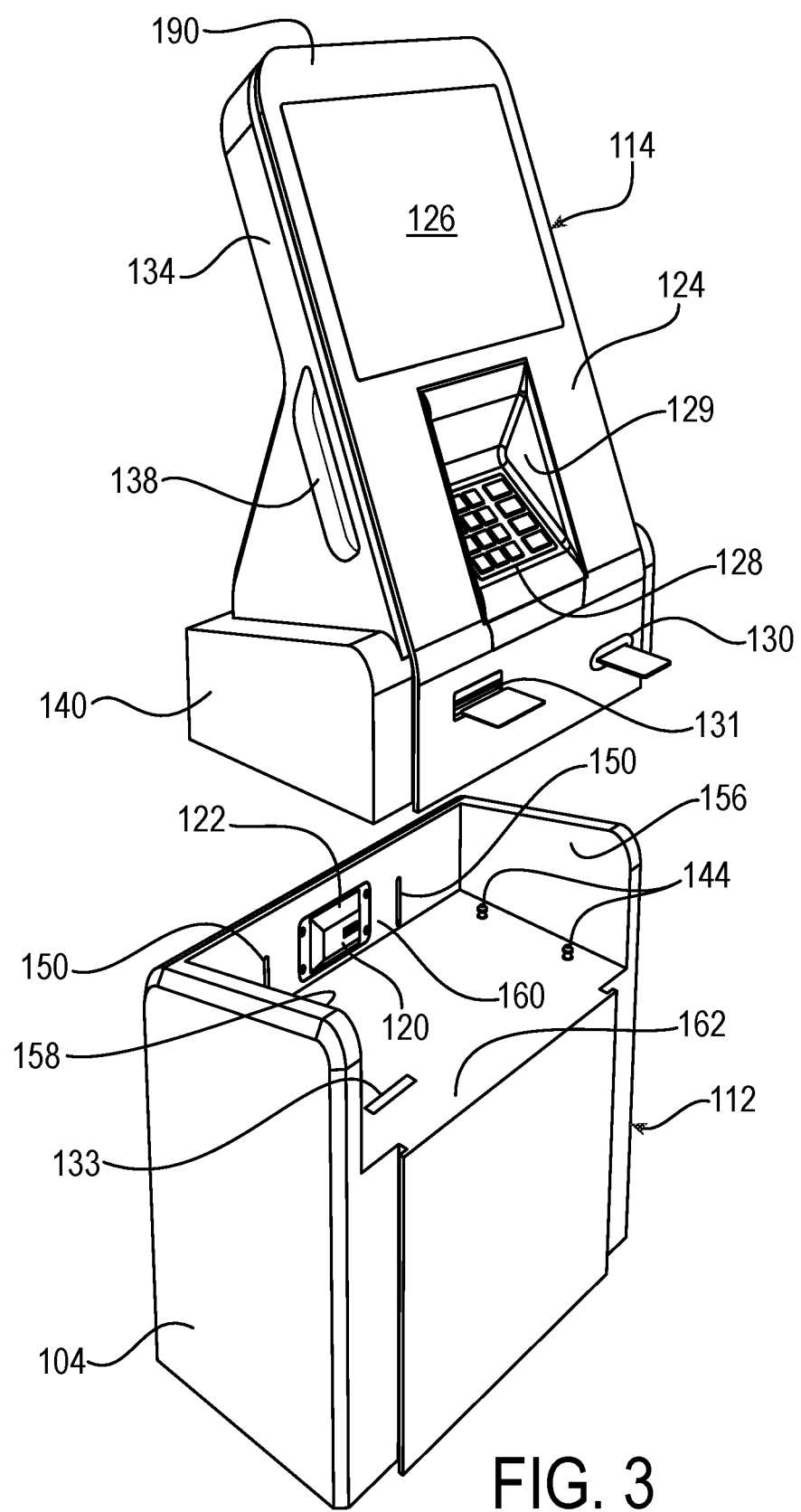
FIG. 3 is a first exploded view of the first configuration of the first embodiment of the present disclosure.

A plurality of different embodiments of the present disclosure are shown in the Figures of the Application. Similar features are shown in the various embodiments of the present disclosure. Similar features have been numbered with a common three-digit reference numeral and have been differentiated by a fourth digit prefix placed before the three common digits. Similar features are structured similarly, operate similarly, and/or have the same function unless otherwise indicated by the drawings or this specification. Furthermore, particular features of one embodiment can replace corresponding features in another embodiment or supplement other embodiments unless otherwise indicated by the drawings or this specification.

Referring now to FIGS. 1-33, 53 and 54, a first exemplary embodiment of the present disclosure is shown as modular ATM 110. The modular ATM 110 can include a cabinet module 112 and a head module 114. The cabinet module 112 can include an outer housing 104. The cabinet module 112 can also include a chest 106 positioned in the outer housing 104 and configured to store notes of value. The cabinet module 112 can also include a transport mechanism 108 positioned in the outer housing 104. The transport mechanism 108 can be engaged with the chest 106 to move the notes of value out of the chest 106 and direct the notes of value away from the chest 106. The cabinet module 112 can also include a base receiving section 120 defined by a plurality of exterior surfaces 156, 158, 160, 162 of the outer housing 104. The cabinet module 112 can also include a first electrical connector 122 mounted in the base receiving section 120 and forming an electrical connection to the transport mechanism 108. The cabinet module 112 can also include a rear door 164 that can be selectively opened to reload the chest 106 with notes of value. The cabinet module 112 can also include a lock 166 to lock the rear door 164 as desired.

The head module 114 can be removably engageable with the cabinet module 112. The head module 114 can include a computing device 168 having one or more processors. The head module 114 can also include at least one user-interface device 126 controlled by the computing device 168. The exemplary user-interface device 126 is a touch screen display. The head module 114 can also include a main structure 124 supporting the at least one user-interface device 126 and the computing device 168. The head module 114 can also include a rear shroud 134 connected to the main structure 124 to enclose a rear side of the at least one user-interface device 126 and the computing device 168. The head module 114 can also include a base 140 supporting the main structure 124 and the rear shroud 134. The head module 114 can also include a second electrical connector 142 mounted in the base 140 and forming an electrical connection to the computing device 168.

The exemplary head module 114 also includes a pin pad or encrypted pin pad 128, a pad shroud 129, and a physical card reader 130, e.g. chip reader and/or magnetic stripe reader. The head module 114 could also include a non-contact card reader and/or a wireless communications device (e.g. Bluetooth, Wi-Fi, Near Field Communication (NFC), and the like) for communication with a personal mobile device. The main structure 124 may include a plurality of apertures for mounting of the components which are or may be optionally included in any desired combination.

The exemplary rear shroud 134 includes optional vents 136 to allow air flow through the head module 114, and most preferably includes upper and lower vents to allow air flow along a longitudinal portion of the removeable head module 114.

When the head module 114 is engaged with the cabinet module 112, the base 140 of the head module 114 can be positioned in the base receiving section 120 between a first and second of the plurality of exterior surfaces, surfaces 156 and 158, that are parallel to one another. Also, when the head module 114 is engaged with the cabinet module 112, the first electrical connector 122 and the second electrical connector 142 are interconnected whereby an electrical connection is established between the computing device 168 and the transport mechanism 108.

Figure 4:
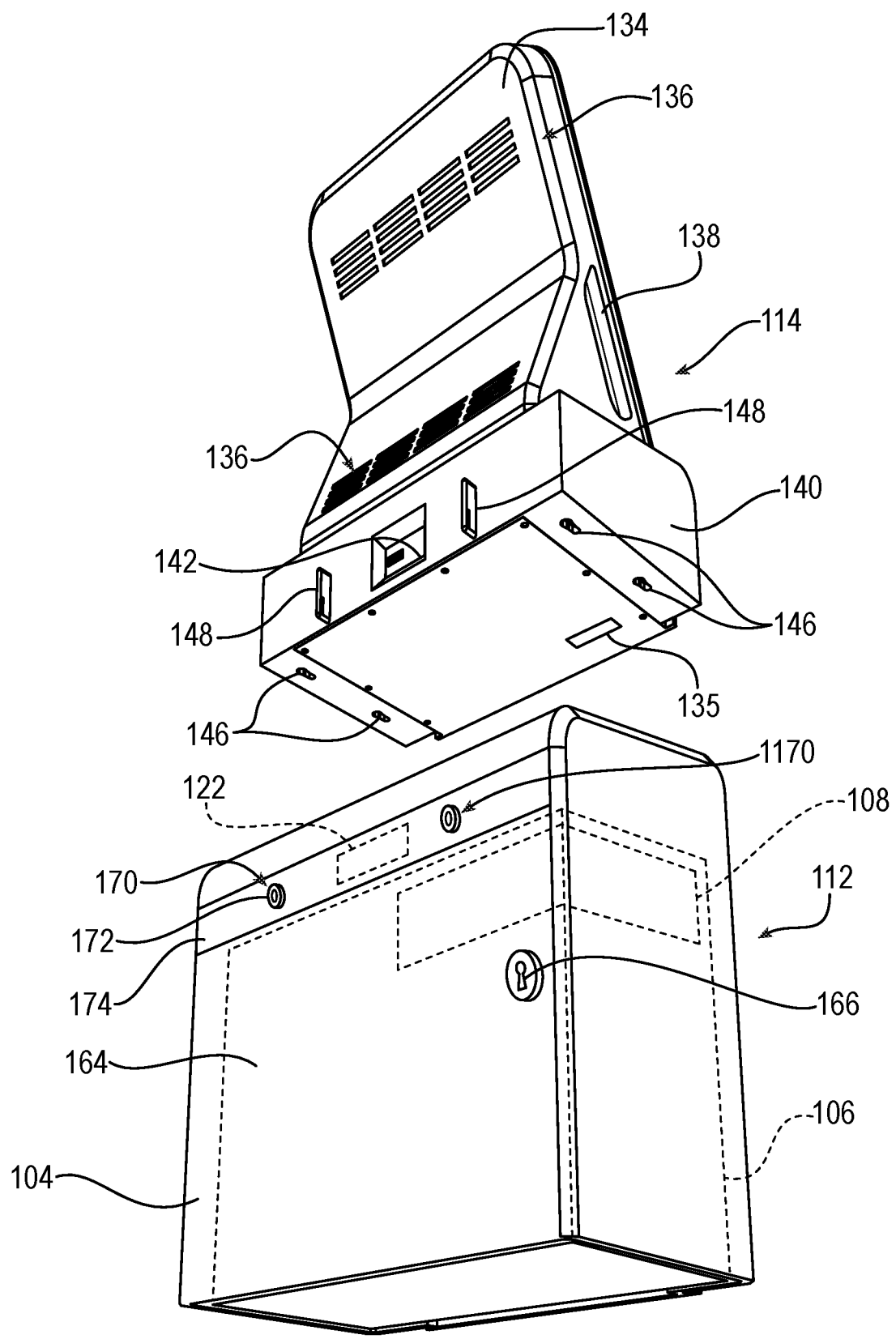
FIG. 4 is a second exploded view of the first configuration of the first embodiment of the present disclosure.
Figure 5:
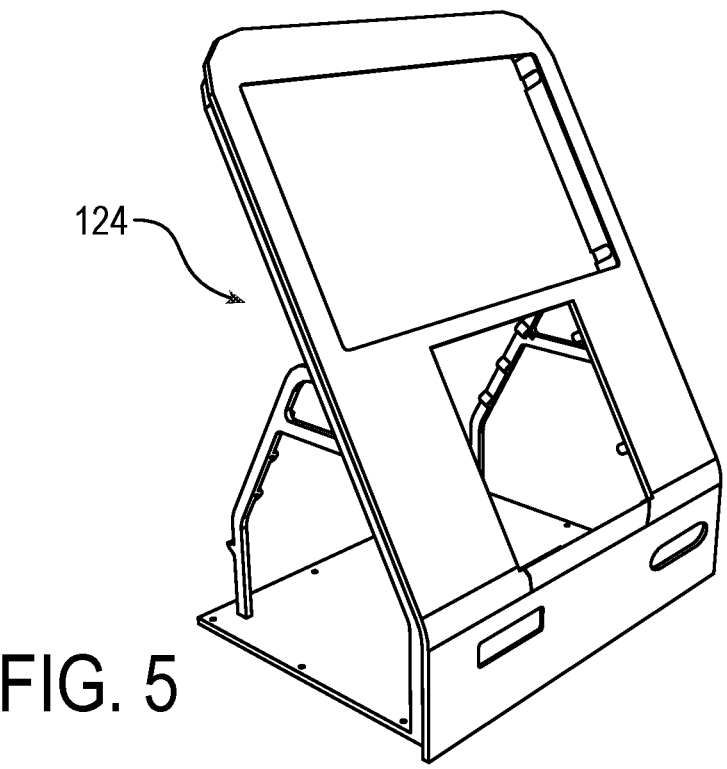
FIG. 5 is a front perspective view of a main structure of a head module of the modular ATM shown in the preceding Figures.
Figure 6:
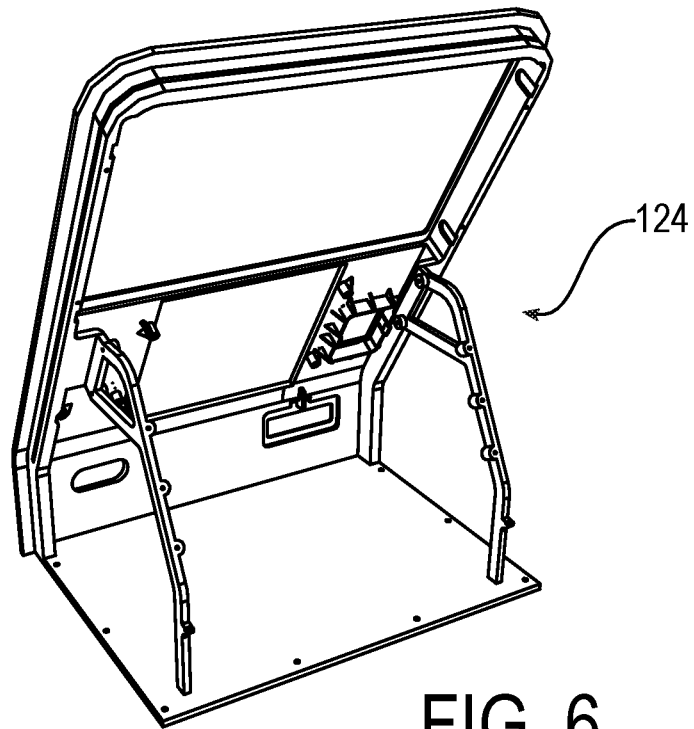
FIG. 6 is a rear perspective view of the main structure shown in FIG. 5.
Figure 7:
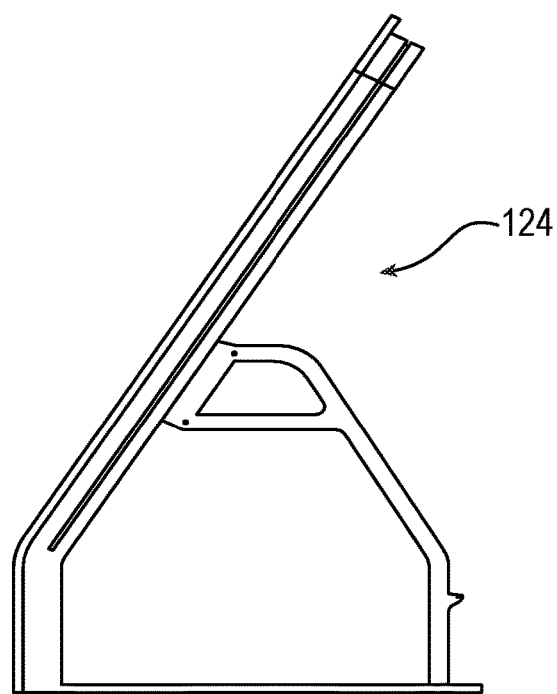
FIG. 7 is a right-side view of the main structure shown in FIG. 5.
Figure 8:
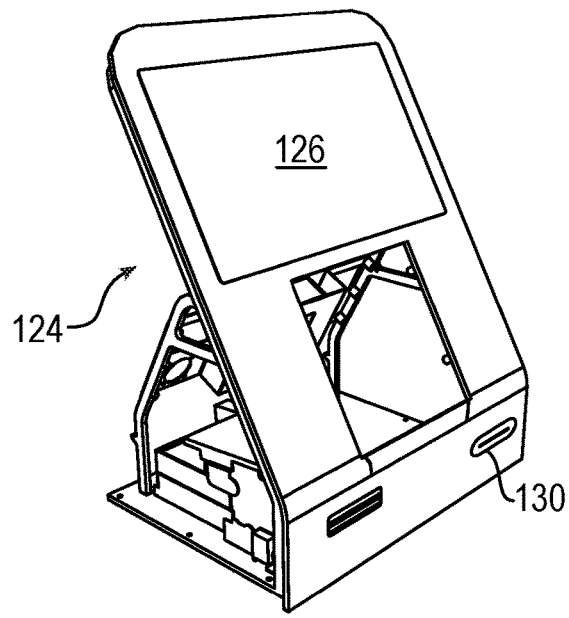
FIG. 8 is a front perspective view of the main structure shown in FIG. 5 with additional components of the head module mounted on the main structure.
Figure 9:
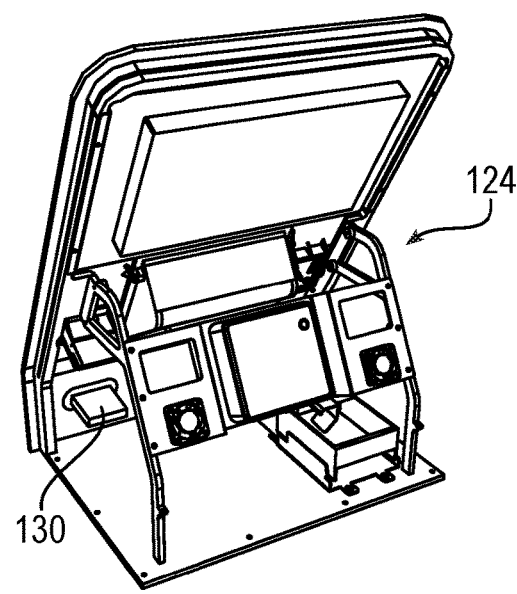
FIG. 9 is a rear perspective view of the main structure shown in FIG. 5 with additional components of the head module mounted on the main structure.
Figure 10:
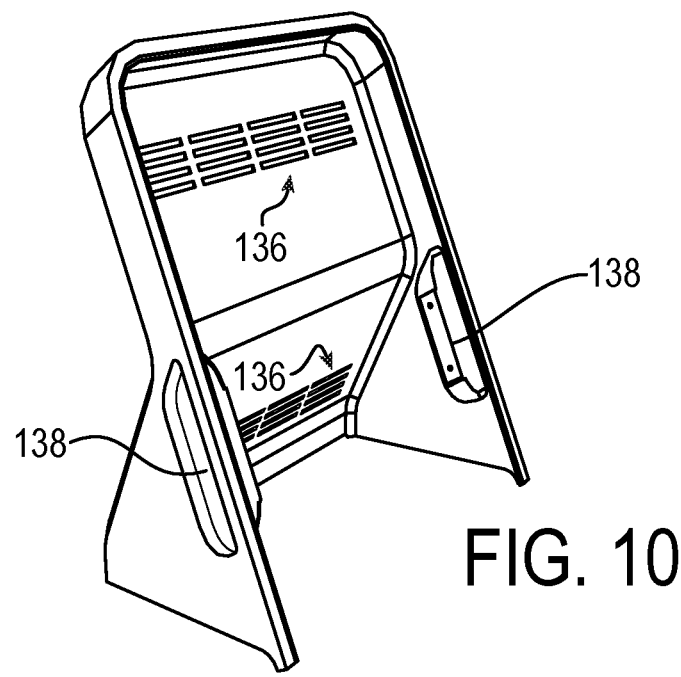
FIG. 10 is a front perspective view of a rear shroud of the head module of the modular ATM shown in the preceding Figures.
Figure 11:
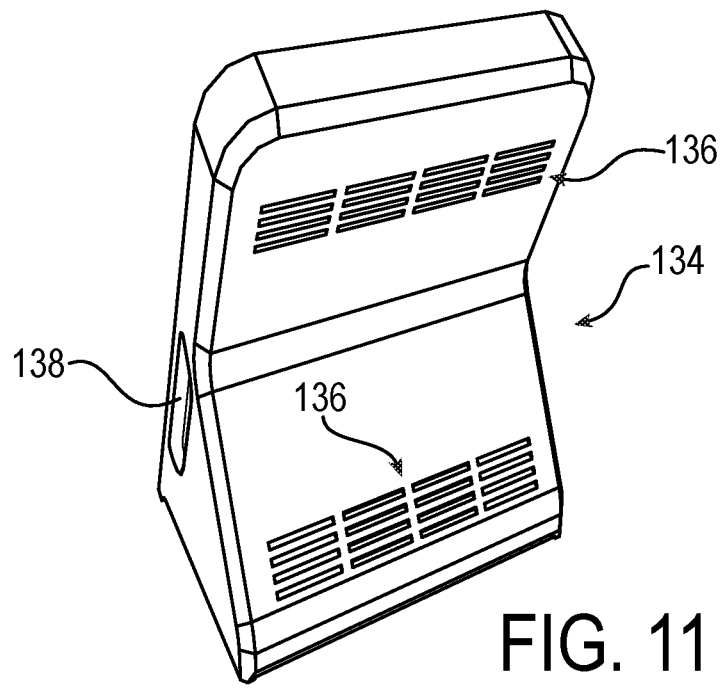
FIG. 11 is a rear perspective view of the rear shroud shown in FIG. 10.
Figure 12:
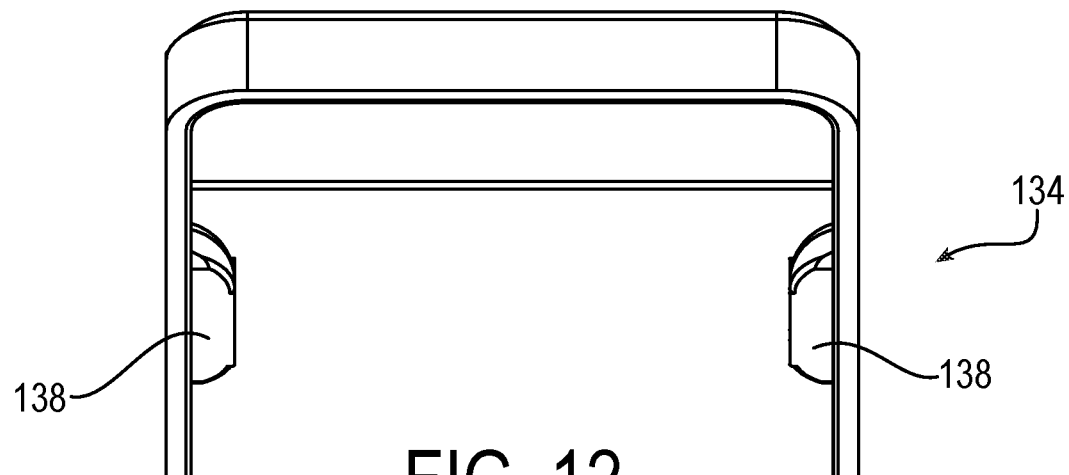
FIG. 12 is a top view of the rear shroud shown in FIG. 10.
Figure 13:
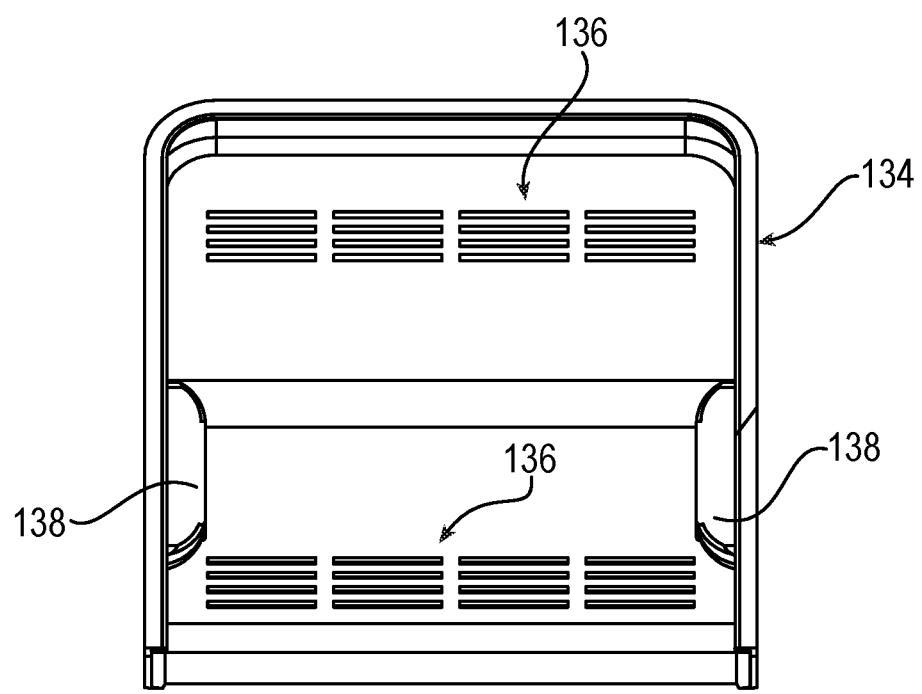
FIG. 13 is a front view of the rear shroud shown in FIG. 10.
Figure 14:
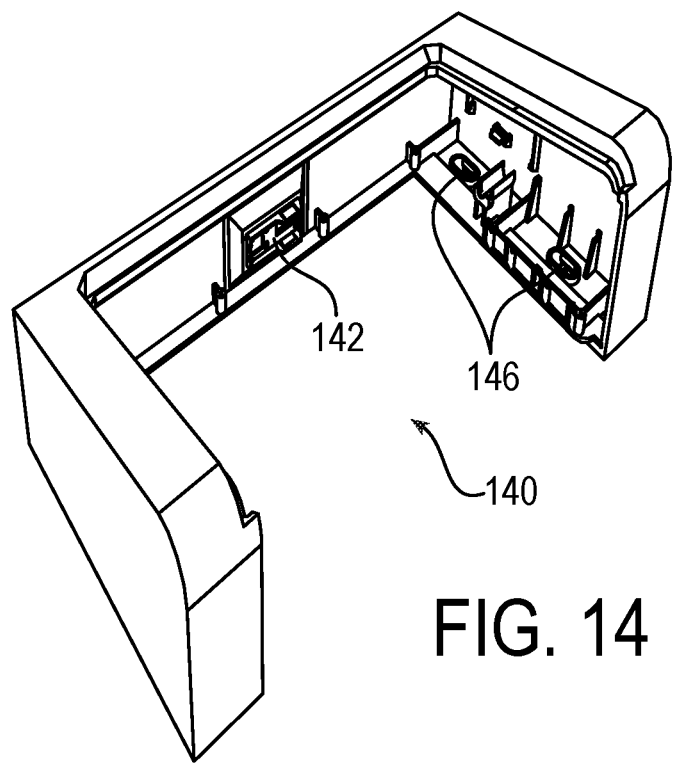
FIG. 14 is a front perspective view of a locking base of the head module of the modular ATM shown in the preceding Figures.
Figure 15:
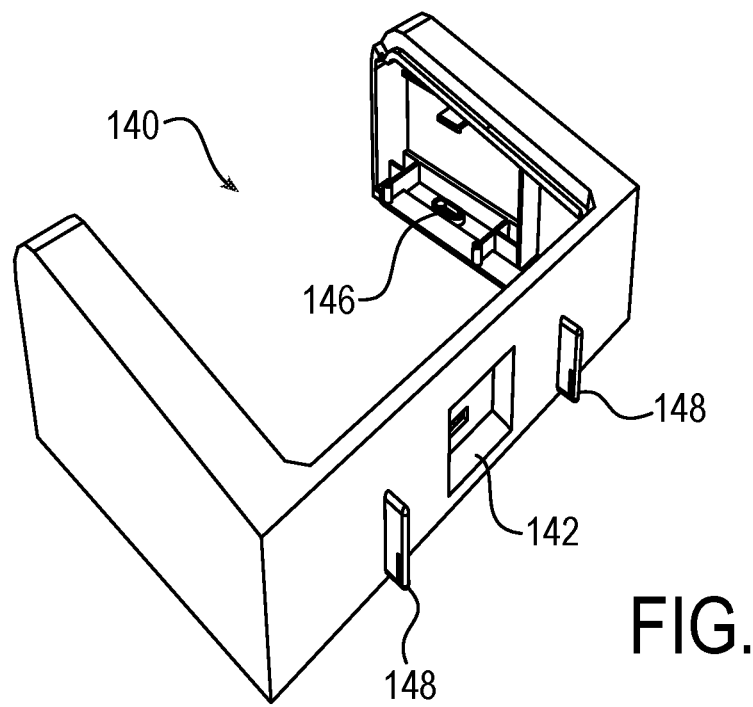
FIG. 15 is a rear perspective view of the locking base shown in FIG. 10.
Figure 16:
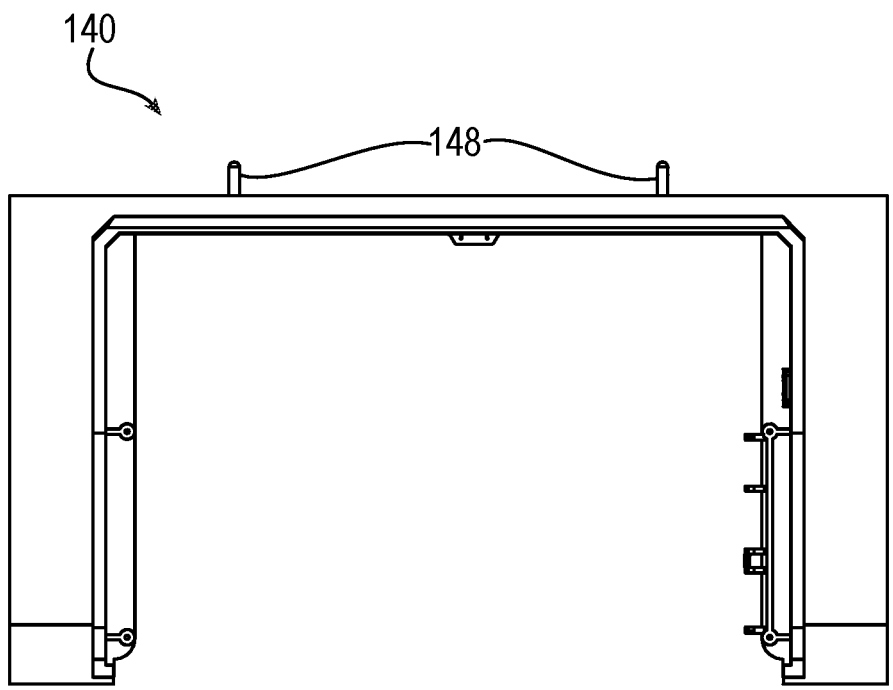
FIG. 16 is a top view of the locking base shown in FIG. 10.
Figure 17:
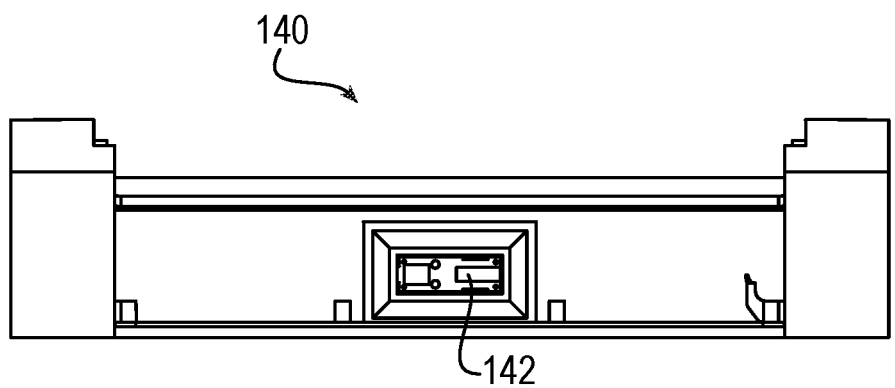
FIG. 17 is a front view of the locking base shown in FIG. 10.
Figure 18:
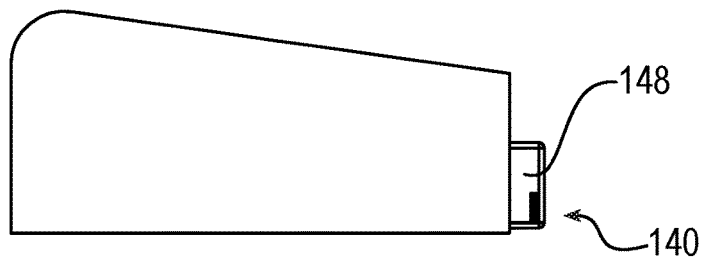
FIG. 18 is a right-side view of the locking base shown in FIG. 10.
Figure 19:
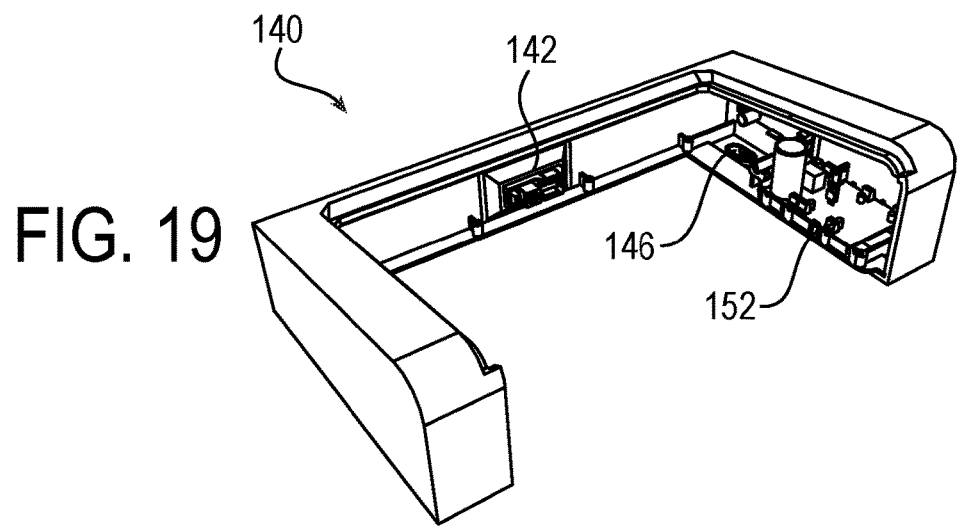
FIG. 19 is a front perspective view of the locking base shown in FIG. 10 with additional components of the head module mounted on the locking base.
Figure 20:
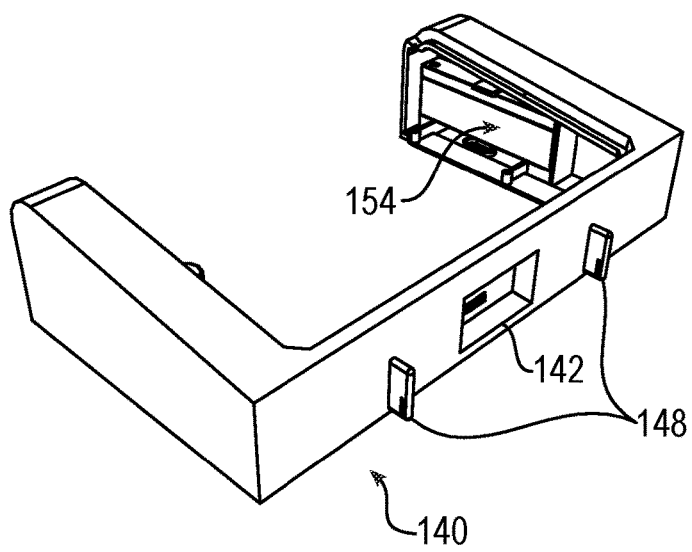
FIG. 20 is a rear perspective view of the locking base shown in FIG. 10 with additional components of the head module mounted on the locking base.
Figure 21:
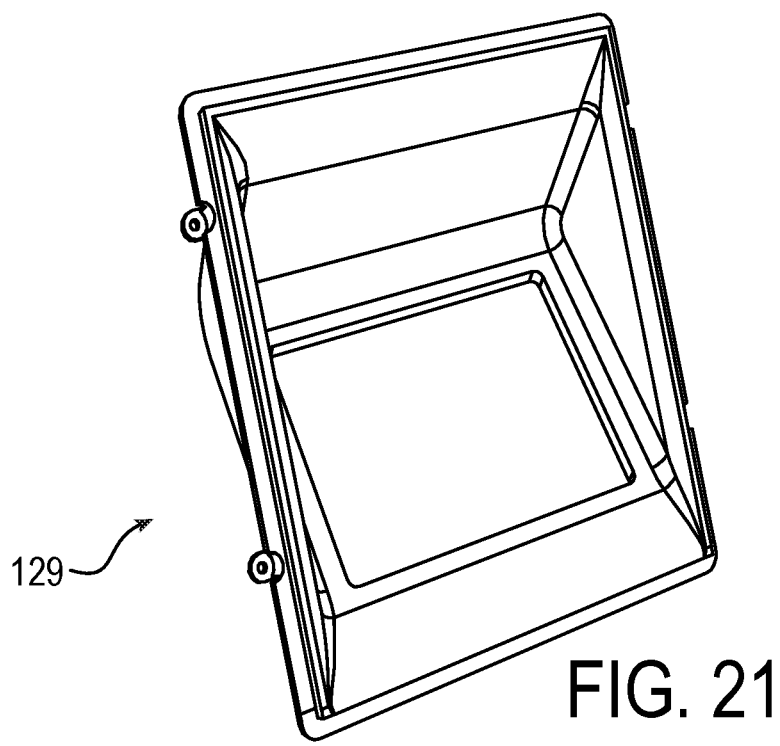
FIG. 21 is a front perspective view of a front shroud of the head module of the modular ATM shown in the preceding Figures.
Figure 22:
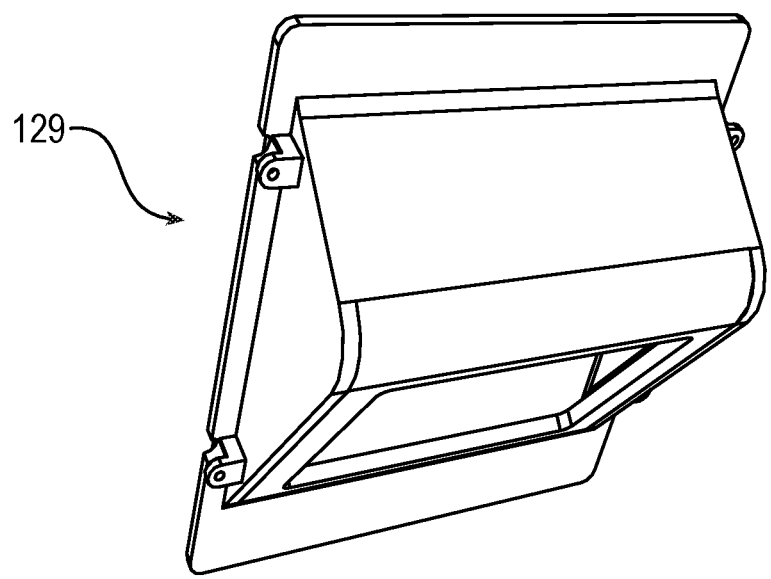
FIG. 22 is a rear perspective view of the front shroud shown in FIG. 21.
Figure 23:
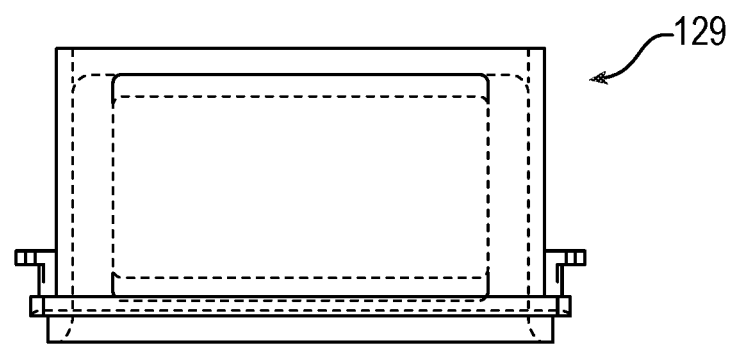
FIG. 23 is a top view of the front shroud shown in FIG. 21.
Figure 24:
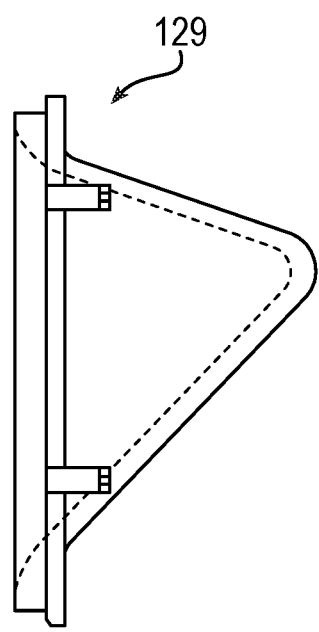
FIG. 24 is a right-side view of the front shroud of FIG. 45.
Figure 25:
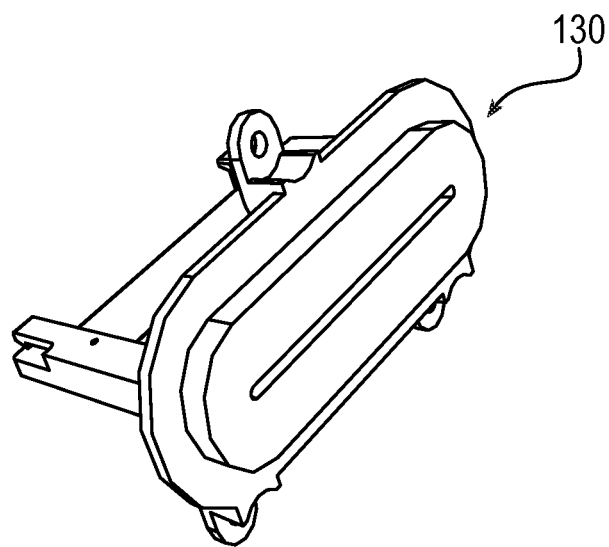
FIG. 25 is a first front perspective view of a bezel for a chip reader interface of the head module of the modular ATM shown in the preceding Figures, from a left side looking right.
Figure 26:
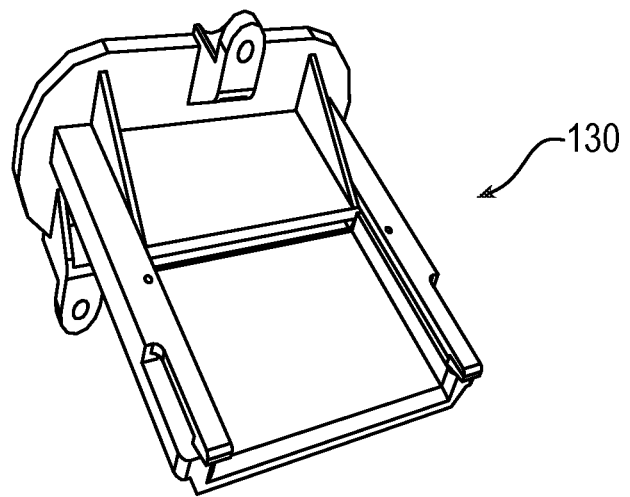
FIG. 26 is a first rear perspective view, from an upper perspective looking down, of the bezel shown in FIG. 25.
Figure 27:
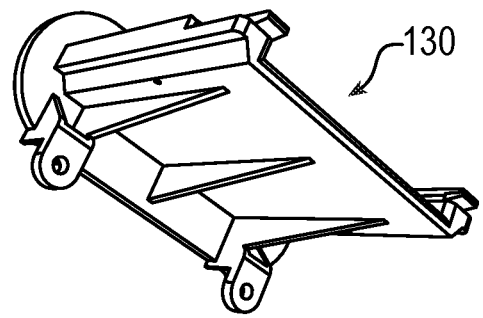
FIG. 27 is a second rear perspective view, from a lower perspective looking up, of the bezel shown in FIG. 25.
Figure 28:
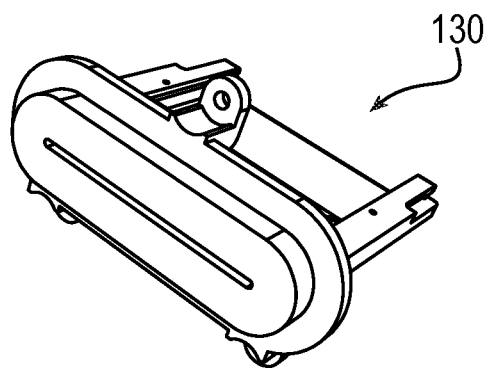
FIG. 28 is a second front perspective view of the bezel shown in FIG. 25, from a right side looking left.
Figure 29:
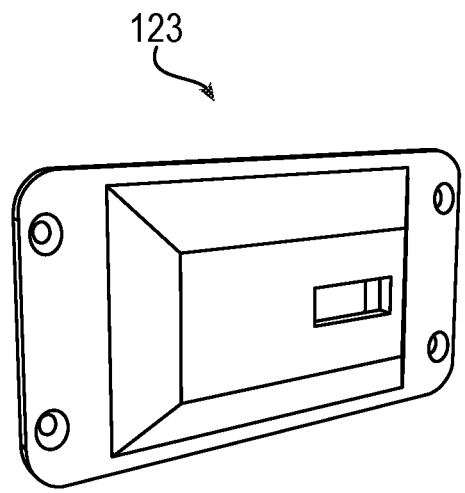
FIG. 29 is a front perspective view of an interface shroud of a cabinet module of the modular ATM shown in the preceding Figures.
Figure 30:
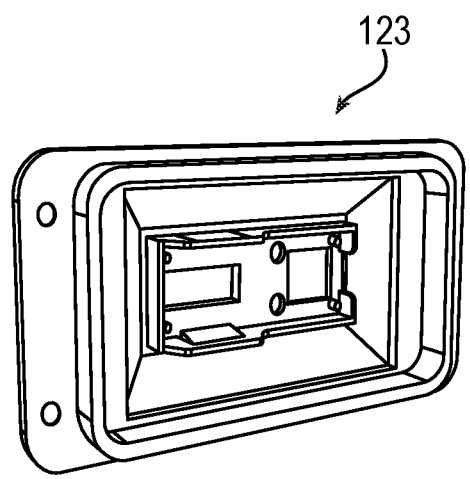
FIG. 30 is a rear perspective view of the interface shroud shown in FIG. 29.
Figure 33:
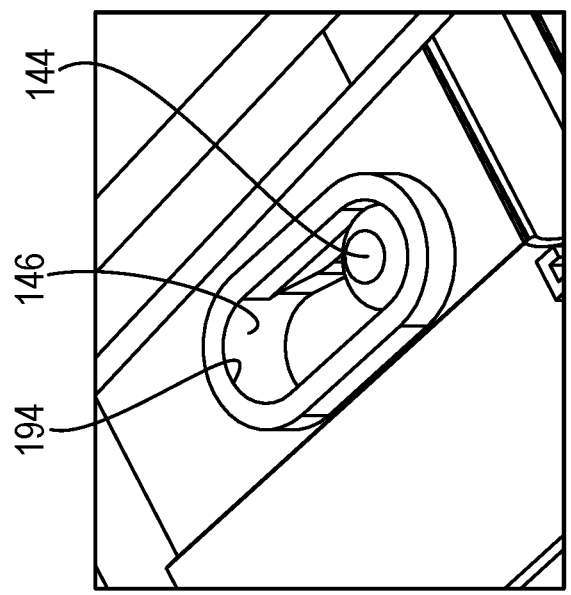
FIG. 33 is a detail view of the locking pin shown in FIG. 32 received in the pin receiver slot shown in FIG. 31.
Figure 32:
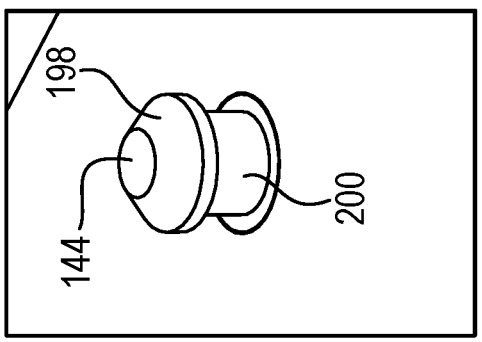
FIG. 32 is a detail view of a locking pin projecting away from a portion of the cabinet module.
Figure 31:
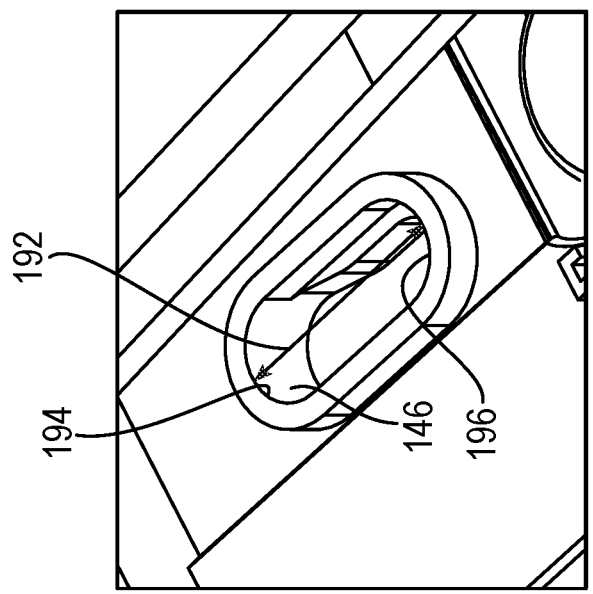
FIG. 31 is a detail view of a pin receiver slot defined by the locking base shown in FIGS. 14-20.

The exemplary modular ATM 110 of claim 1 further comprising at least one locking mechanism configured to lock said head module 114 and said cabinet module 112 together. FIG. 4 shows that the exemplary modular ATM 110 includes a plurality of locking mechanism, including a first referenced at 170 and a second referenced at 1170. In the exemplary embodiment, the locking mechanisms 170, 1170 are identical and only the locking mechanism 170 will be described in greater detail.

Figure 53:
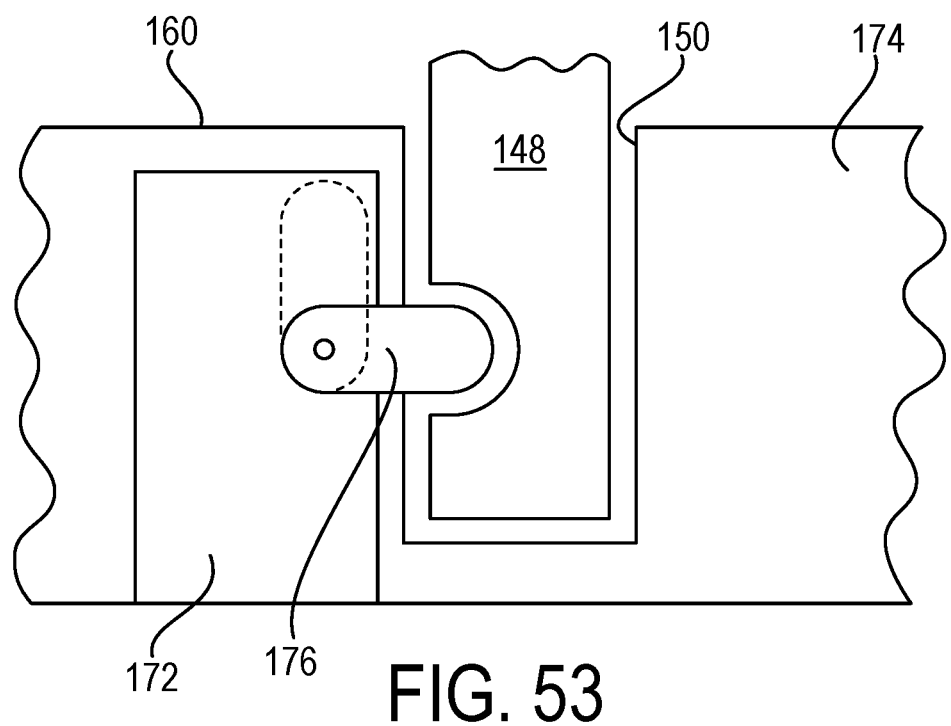
FIG. 53 is a cross-sectional view of a first embodiment of a locking mechanism.

The exemplary locking mechanism 170 includes an exemplary locking cylinder 172 positioned in a wall 174 of the outer housing 104. The exemplary wall 174 defines the third surface 160 of the plurality of exterior surfaces 156, 158, 160, 162. Referring now to FIG. 53, the exemplary locking cylinder 172 includes an exemplary latch 176 moveable between first and second positions. The latch 176 is shown in solid line in the first position and in dash line in the second position.

The exemplary locking mechanism 170 also includes a blade 148 projecting rearwardly from the base 140. The blade 148 projects parallel to the first and second 156, 158 of the plurality of exterior surfaces. The exemplary locking mechanism 170 also includes a slot 150 defined in a third surface 160 of the plurality of exterior surfaces 156, 158, 160, 162 of the base receiving section 120. The exemplary third surface 160 of the plurality of exterior surfaces 156, 158, 160, 162 is normal to the exemplary first surface 156 and second surface 158 of the plurality of exterior surfaces 156, 158, 160, 162. The exemplary blade 158 is received in the exemplary slot 150 when the head module 114 is engaged with the cabinet module 112.

The exemplary locking cylinder 172 communicates with the exemplary slot 150. The exemplary locking cylinder 172, through the exemplary latch 176, is configured to selectively engage the blade 148 when the head module 114 is engaged with the cabinet module 112. The exemplary locking mechanism 170 is configured to receive a key to be changed between a locked state and an unlocked state. In the locked state, the latch 176, while in the first position, engages the blade 148 as shown in FIG. 53. In the unlocked state, the latch 176 is in the second position, is spaced from the first position, and is not engaging the blade 148.

Figure 54:
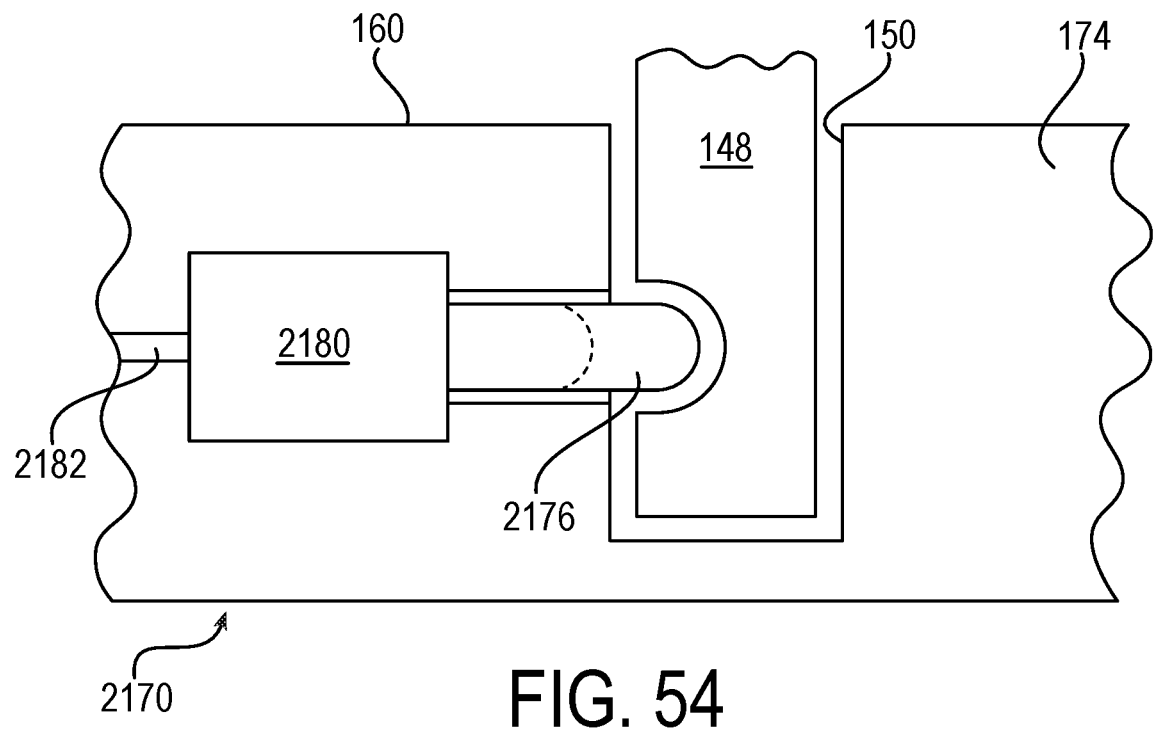
FIG. 54 is a cross-sectional view of a second embodiment of a locking mechanism.

The exemplary head module 114 also includes an exemplary transceiver 178 configured to communicate using near field communication protocol, Bluetooth protocol, and/or to communicate with a wide array network such as the Internet or a cellular phone network. The exemplary transceiver 178 can be utilized in one or more embodiments of the present disclosure with the locking mechanism 170. FIG. 54 discloses an embodiment in which a locking mechanism 2170 includes an exemplary latch 2176 moveable between a first position engaging the exemplary blade 148 and an exemplary actuator 2180 configured to move the exemplary latch 176 between the first position and the second position. The exemplary actuator 2180 is controlled by the computing device 168 in response to communications received by the exemplary transceiver 178. A wire for the communication of signals between the actuator 2180 and the computing device 168 is referenced at 2182.

For example, a service technician seeking to remove the head module 114 from the cabinet module 112 may use a mobile computing device to receive a code from a server and communicate the code to the computing device 168 through the transceiver 178. The communication can be sent by NFC or Bluetooth protocols. Alternatively, the service technician can request unlocking from a remote server, the server can transmit an unlocking code to the computing device 168 over a wide array network. In response to receiving the code, the computing device 168 can control the actuator 2180 to move the latch 2176 to the second (unlocked) position. In another embodiment, the service technician can enter an unlocking code through the user-interface device 126.

In exemplary processing for engaging the head module 114 onto the cabinet module 112, the head module 114 can be grasped by integrally-formed handles. The exemplary head module 114 includes first and second handles 138 integrally formed into the rear shroud 134 and positioned on opposite lateral sides of the user-interface device 126. The exemplary first and second handles 138 are first and second recesses extending into the opposite lateral sides of the rear shroud 134. Each of the first and second recesses has a length and width and the length larger than the width. The length of one of the handles 158 is referenced at 184 in FIG. 2 and the width at 186. The exemplary main structure 124 defines a fascia portion 188 with a surface 190 extending around the at least one user-interface device 126. The exemplary length 184 extends parallel to the surface 190 of the fascia portion 188, thus providing a better gripping point. The handles 138 can be utilized for moving, lifting, or carrying the head module 114.

The head module 114 can be lowered in the base receiving section 120. The surfaces 156 and 158 guide opposite sides of the base 140 as the head module 114 is lowered. A fourth exterior surface 162 of the plurality of exterior surfaces 156, 158, 160, 162 is traverse to the first and second surfaces 156, 158 and also traverse to the third exterior surface 160. The base 140 of the head module 114 can be lowered to rest on the fourth exterior surface 162.

The exemplary modular ATM 110 also includes a plurality of locking pins and slots. In the exemplary embodiment, the pins are identical to one another and the slots are identical to one another. An exemplary locking pin 144 projects away from the fourth exterior surface 162 in the base receiving section 120 of the cabinet module 112. In alternative embodiments, a locking pin could project away from an underside of the base 140 of the head module 114. An exemplary slot 146 is defined in the underside of the base 140 of the head module 114. The exemplary locking pin 144 is received in the exemplary slot 146 when the head module 114 is engaged with the cabinet module 112.

The exemplary slot 146 is elongated and extends a length 192 between first and second opposite ends 194, 196. The exemplary locking pin 144 is moveable along the length 192 of the exemplary slot 146 when the exemplary locking pin 144 is positioned in the exemplary slot 146. The exemplary locking pin 144 includes a head 198 and a neck 200. The exemplary neck 200 is between the head 198 and the fourth exterior surface 162. The exemplary neck 200 is narrower than the head 198.

The exemplary slot 146 defines a variable width along the length 192. The exemplary slot 146 has a first width at the first end 194 and a second width at the second end 196. The first width is wider than the second width. The head 198 is receivable in the first end 194 but not in the second end 196. The neck 200 is receivable in the exemplary slot 146 along all of the length 192. The head 198 is positioned at the second end 196 when the head module 114 is engaged with the cabinet module 112.

When the head module 114 is lowered onto the fourth exterior surface 162, the head 198 is received into the slot 146 at the first end 194 and is thus first positioned at the first end 194 of the exemplary slot 146. The head module 114 can then be slid across the first and second surfaces 156, 158 as well as the fourth exterior surface 162 until the head 198 reaches the second end 196 of the exemplary slot 146. In the exemplary embodiment, this occurs before the head module 114 contacts the third exterior surface 162 to protect the first electrical connector 122 and the second electrical connector 142. Contact between the head 198 and the second end 196 or the neck 200 and the second end 196 positively stops movement of the head module 114.

When the head module 114 has been fully slid across the base receiving section 120 and the pins 144 and slots 146 prevent further movement, the first and second electrical connectors 122, 142 are interconnected. The engagement between the respective sliding surfaces of the cabinet module 112 and the head module 114 prevent the connectors 122, 142 from being damaged through misalignment. The pins 144 and slots 146 prevent the connectors 122, 142 from being damaged through excessive movement in the connecting direction. In the exemplary modular ATM 110, electrical data signals and electrical power are communicated through the first electrical connector 122 and the second electrical connector 142 when the head module 114 is engaged with the cabinet module 112.

The exemplary head module 114 also includes a power circuitry 152 for distributing electrical power among the subcomponents of the ATM 110, such as the user interface device 126. The exemplary head module 114 also includes a battery 154 selectively supplying electrical power to the computing device 168 and the at least one user-interface device 126 and the exemplary actuator 2180, in the event that grid power is lost and when the head module 114 is disconnected from the cabinet module 112. The exemplary ATM 110 is configured such that subcomponents may be hot swapped, meaning that subcomponents that are not being replaced can continue to be powered or not requiring rebooting the ATM 110.

When dispensing notes of value, the computing device 168 can control the transport mechanism 108 to draw notes from the chest 106 and move the notes through a slot or port (not shown) in the top of the chest 106. The head module 114 can include a secondary transport mechanism 202 to receive the notes from the transport mechanism 108 and direct the notes through the slot 131 to the user.

Figure 34:
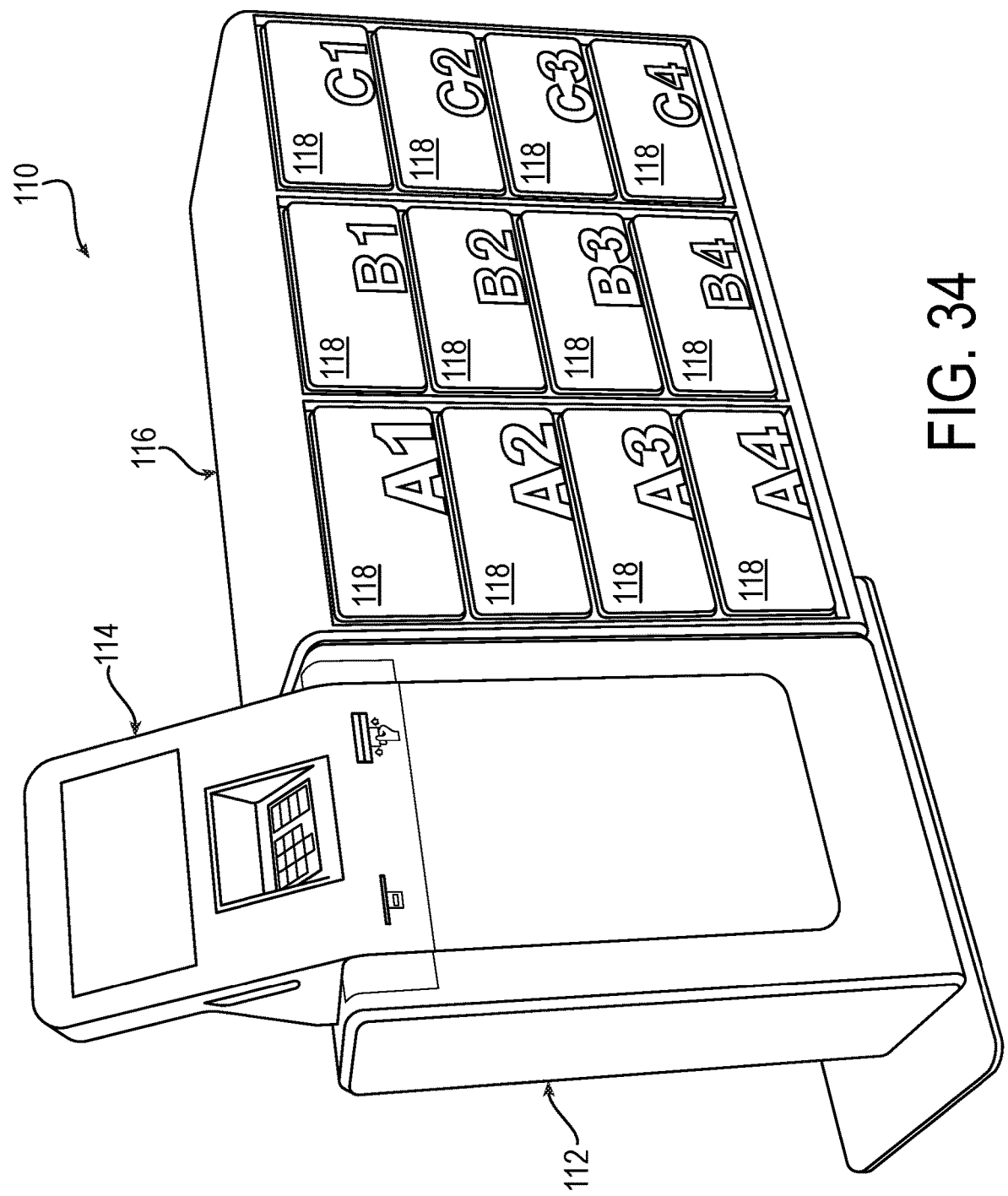
FIG. 34 is a perspective view of a second alternative embodiment of the present disclosure.

Referring now to FIG. 34, in a second embodiment of the present disclosure, the ATM 110 is paired with at least one bank 116 of lockers 118 positioned adjacent to the cabinet module 112. The at least one bank 116 of lockers 118 can have a plurality of individual lockers 118. Each of the plurality of individual lockers 118 can have a door and a lock configured to selectively lock the door. The locks of the at least one bank 116 of lockers 118 can be controlled by the computing device 168. The exemplary locks of the plurality of bank 116 lockers 118 are fully concealed within the at least one bank 116 of lockers 118. Such lockers 118 may be used, for example, for the purchase or exchange of goods, or leased for storage, among other uses. A user can open a locker 118 by entering information through the user-interface 126. It is contemplated that lockers 118 in the bank 116 may be added or removed as desired.

Figure 35:
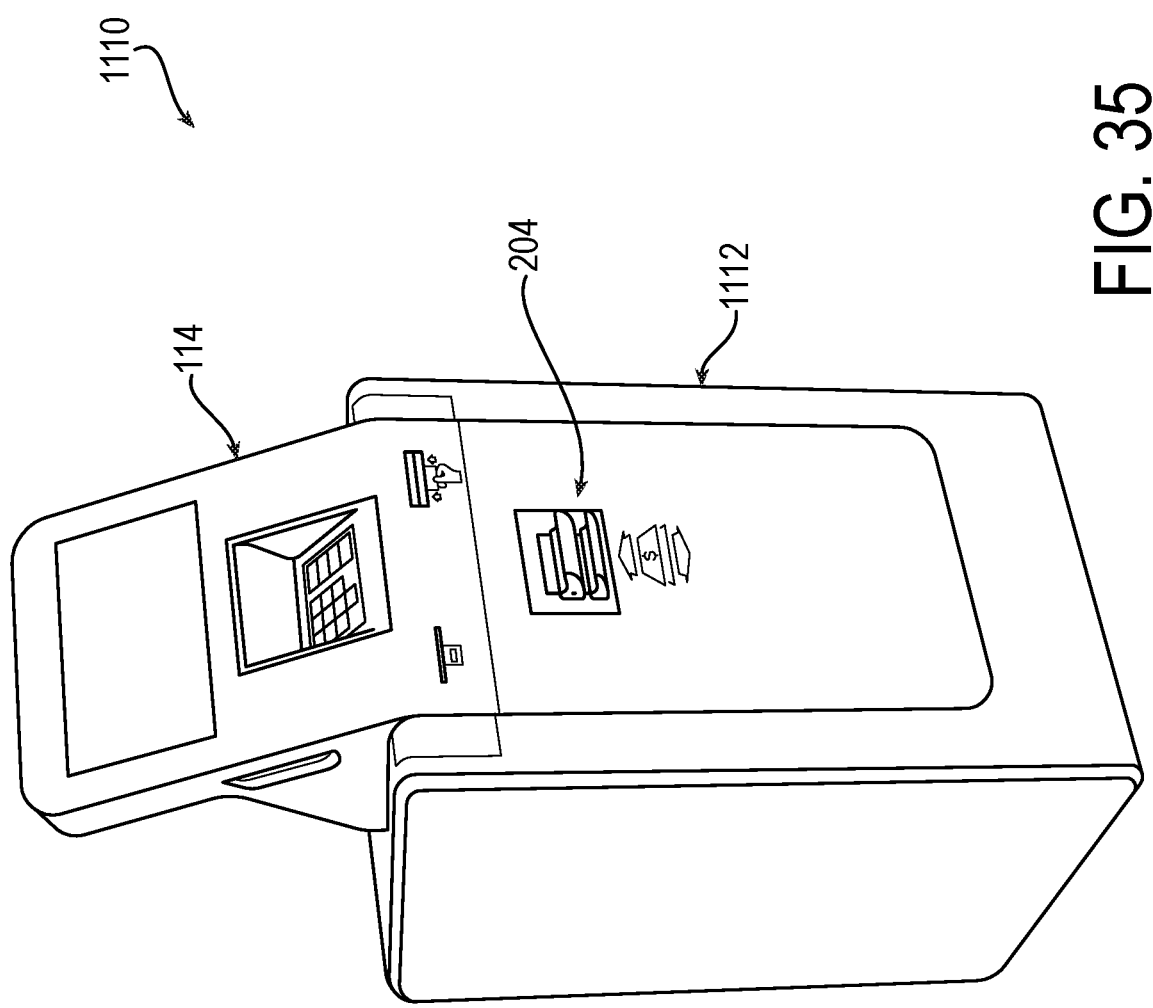
FIG. 35 is a perspective view of a third alternative embodiment of the present disclosure.
Figure 36:
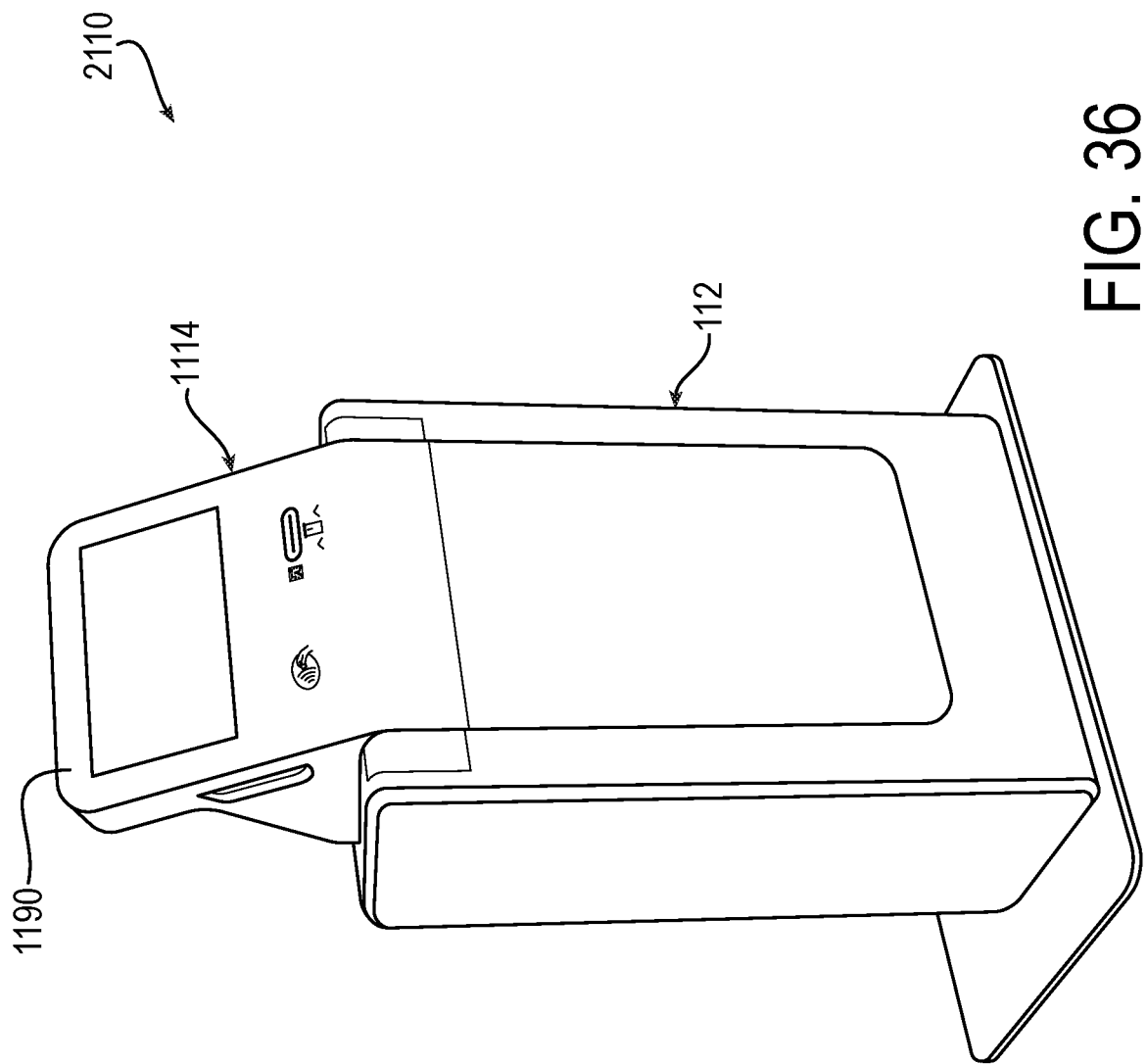
FIG. 36 is a perspective view of a fourth alternative embodiment of the present disclosure.
Figure 37:
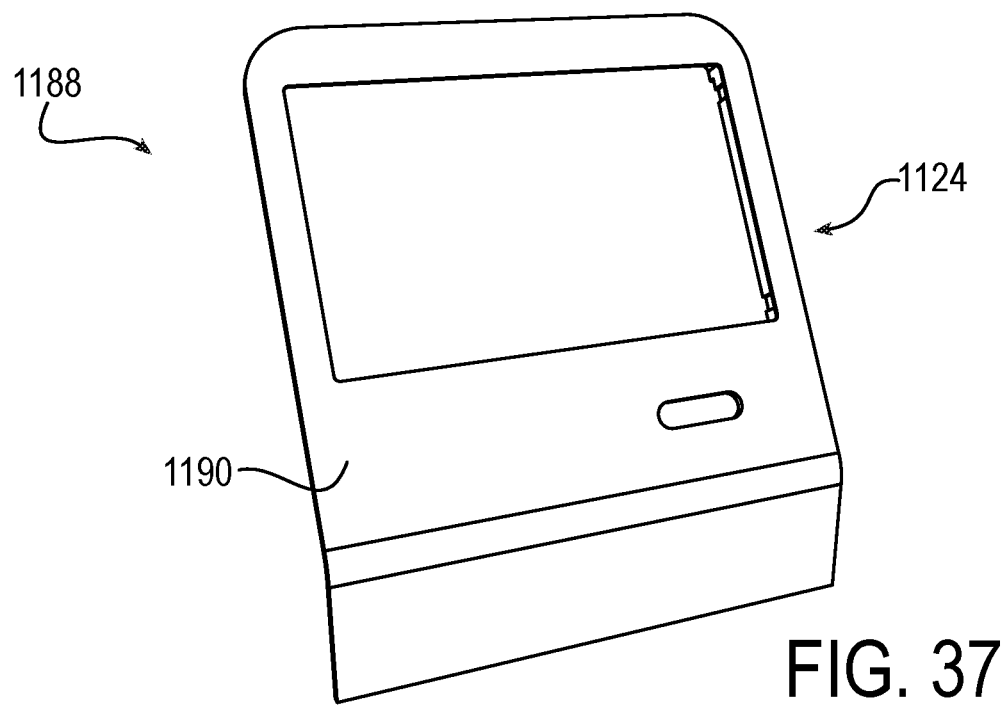
FIG. 37 is a front perspective view of a fascia portion of a main structure for a head module of the fourth alternative embodiment of the present disclosure.
Figure 38:
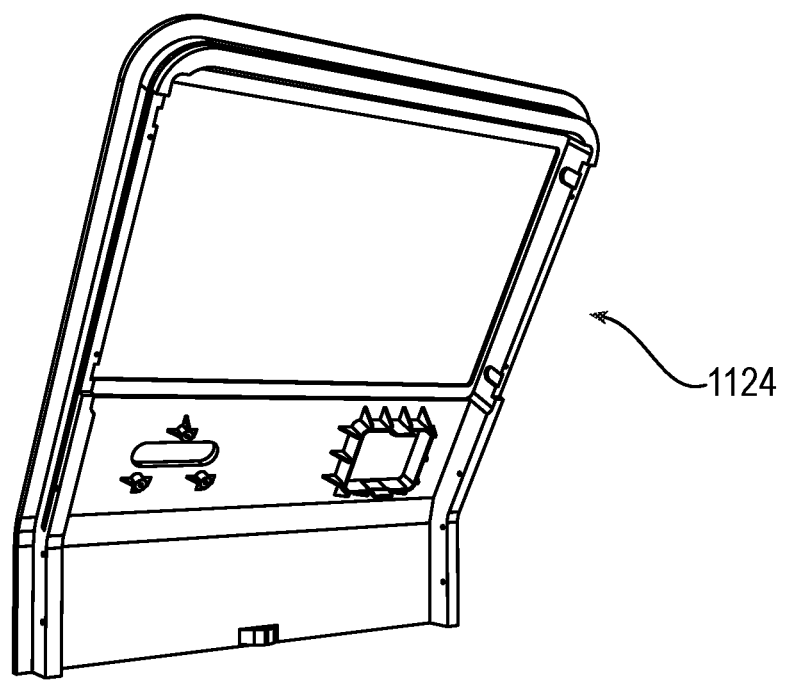
FIG. 38 is a rear perspective view of the fascia portion shown in FIG. 37.
Figure 39:
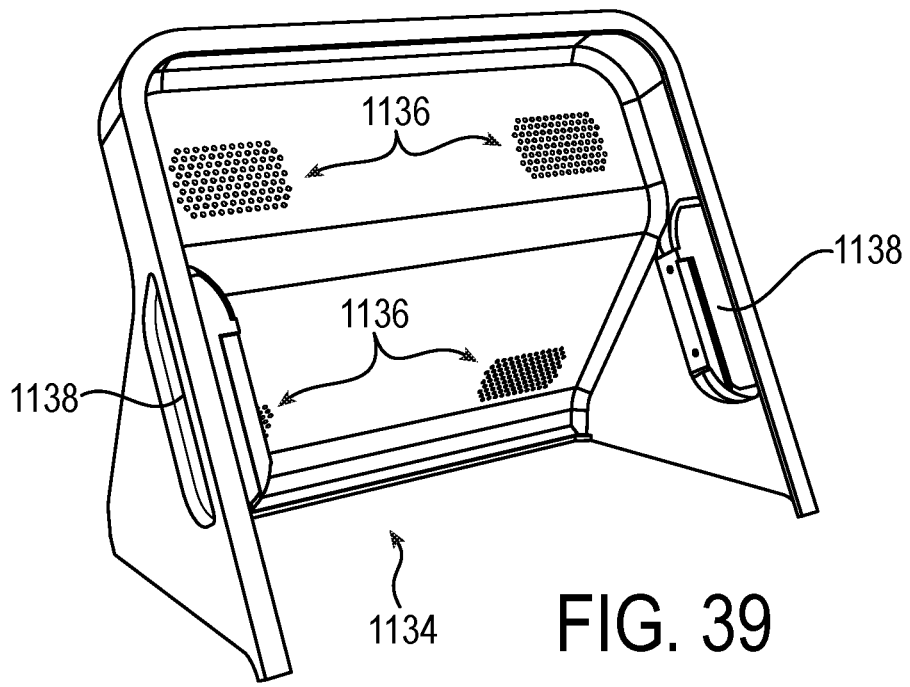
FIG. 39 is a front perspective view of a rear shroud for the head module of the fourth alternative embodiment of the present disclosure.
Figure 40:
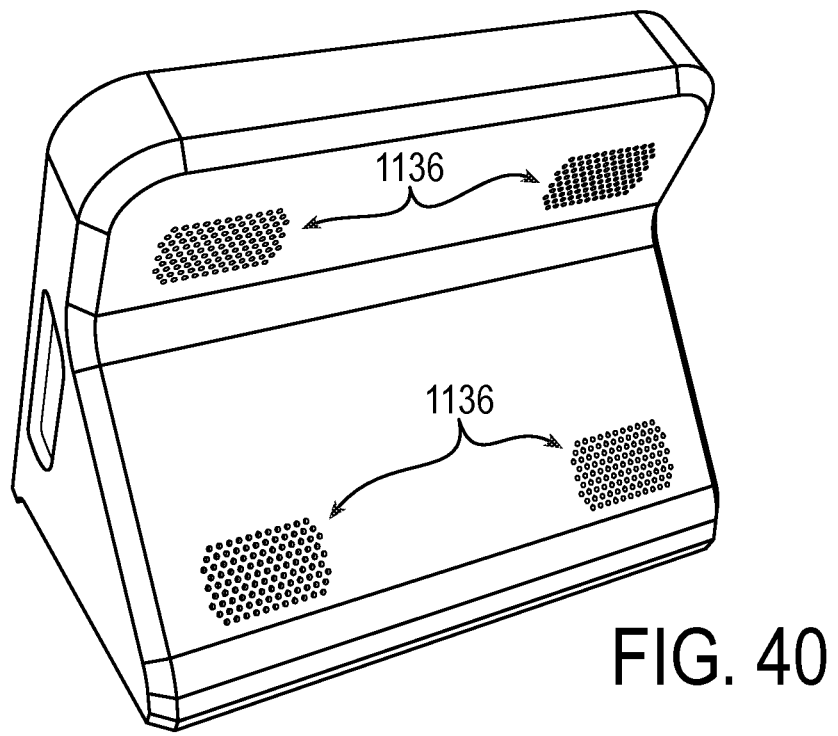
FIG. 40 is a rear perspective view of the rear shroud shown in FIG. 39.
Figure 41:
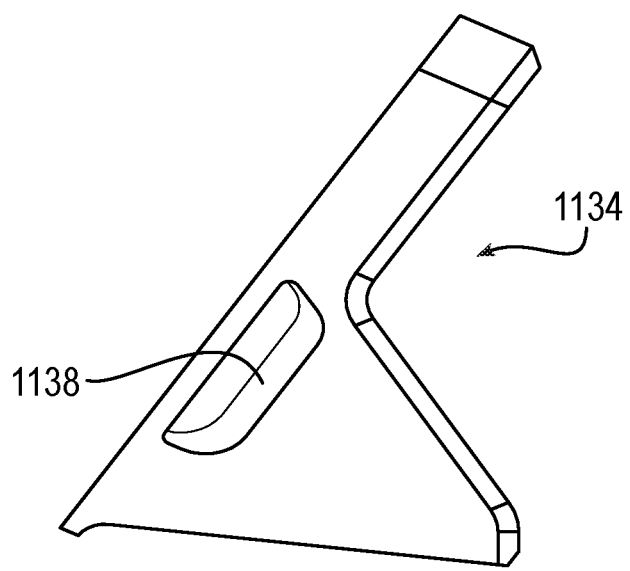
FIG. 41 is a side view of the rear shroud shown in FIG. 40.

Referring now to FIG. 35, in a third embodiment of the present disclosure, an ATM 1110 includes the head module 114 and a cabinet module 1112. The head module 114 and the cabinet module 1112 releasibly interconnect with one another in the same way, using the same structures, as the head module 114 and the cabinet module 112. The cabinet module 1112 differs from the cabinet module 112 by including an input/output slot 204. Notes of value or checks can be received from a user through the input/output slot 204. Notes of value can be dispensed to the user through the input/output slot 204. The chest and transport mechanism of the cabinet module 1112 differs structurally from the chest 106 and transport mechanism 108 to effectuate the different path of movement of the notes of value relative to the path of movement defined by the ATM 110.

Referring now to FIGS. 36-41, in a fourth embodiment of the present disclosure, an ATM 2110 includes a head module 1114 and the cabinet module 112. The head module 1114 and the cabinet module 112 releasibly interconnect with one another in the same way, using the same structures, as the head module 114 and the cabinet module 112. The exemplary head module 1114 includes a main structure 1124 defining a fascia portion 1188 with a fascia surface 1190. The exemplary main structure 1124 interconnects with a rear shroud 1134. The rear shroud 1134 includes optional vents 1136 to allow air flow through the head module 1114, and most preferably includes upper and lower vents to allow air flow along a longitudinal portion of the head module 1114. The rear shroud 1134 also defines first and second handles 1138 integrally formed into the rear shroud 1134 on opposite lateral sides.

Figure 42:
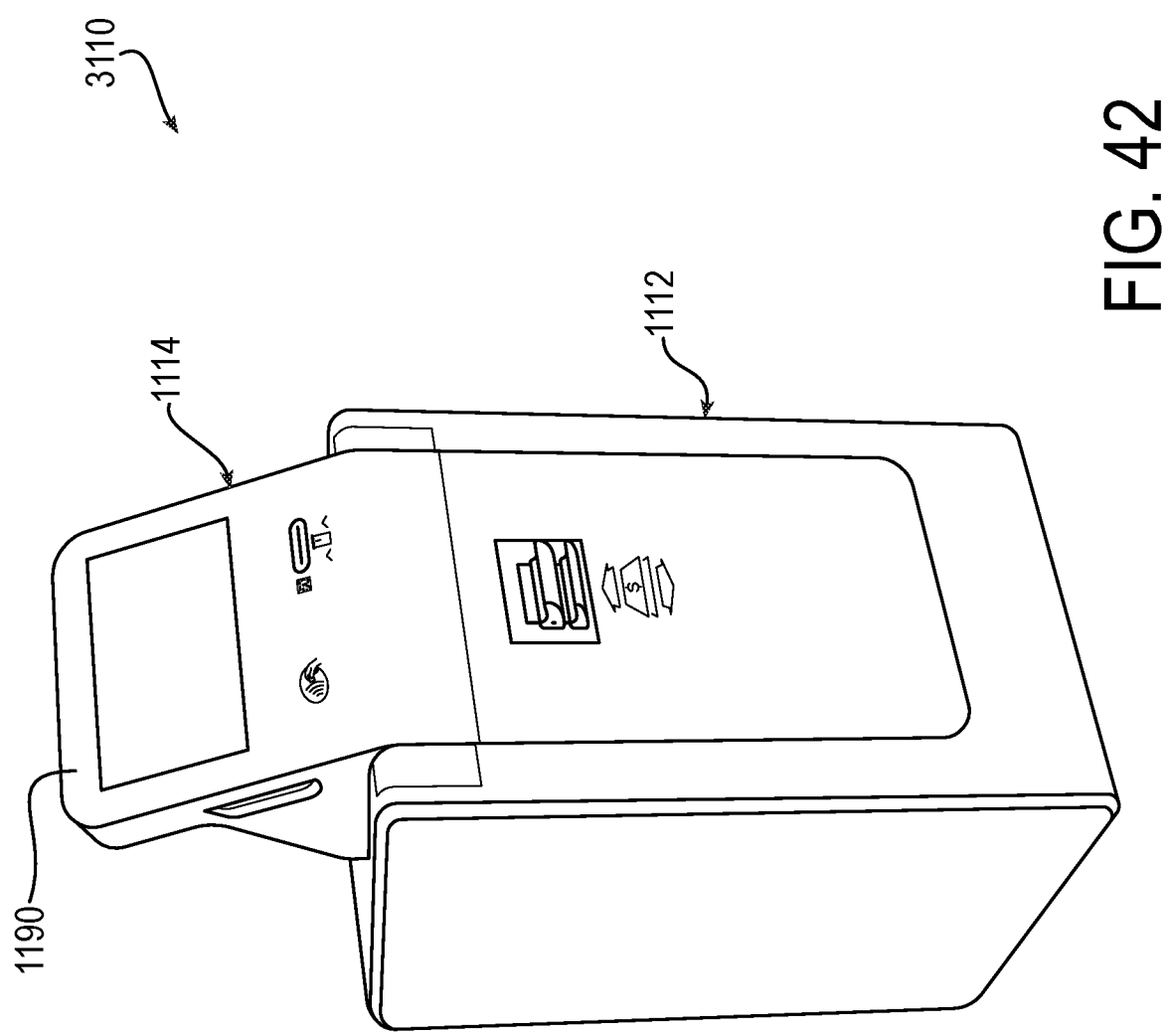
FIG. 42 is a perspective view of a fifth alternative embodiment of the present disclosure.

Referring now to FIG. 42, in a fifth embodiment of the present disclosure, an ATM 3110 includes the head module 1114 and the cabinet module 1112. The head module 1114 and the cabinet module 1112 releasibly interconnect with one another in the same way, using the same structures, as the head module 114 and the cabinet module 112.

Figure 43:
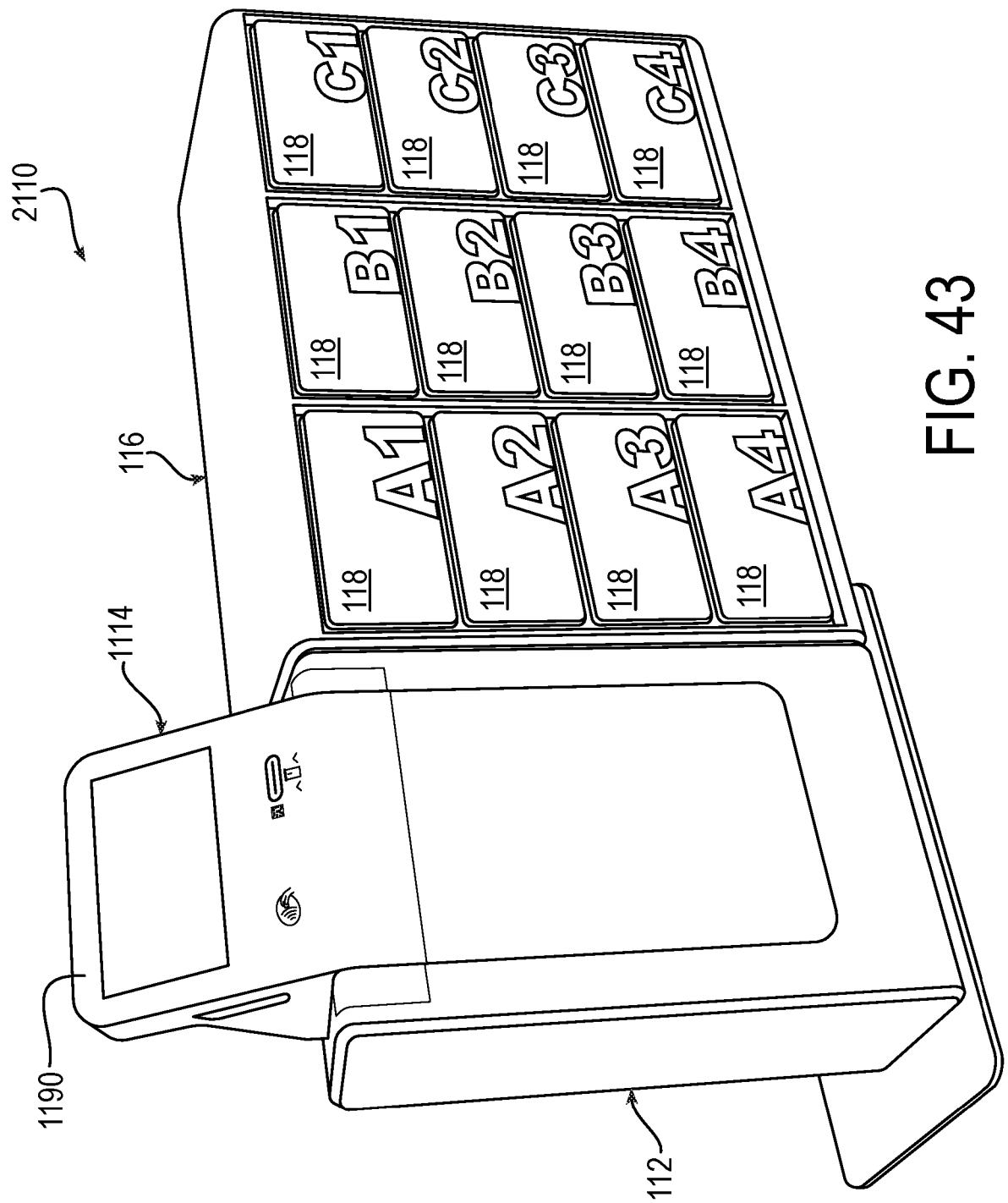
FIG. 43 is a perspective view of a sixth alternative embodiment of the present disclosure.
Figure 44:
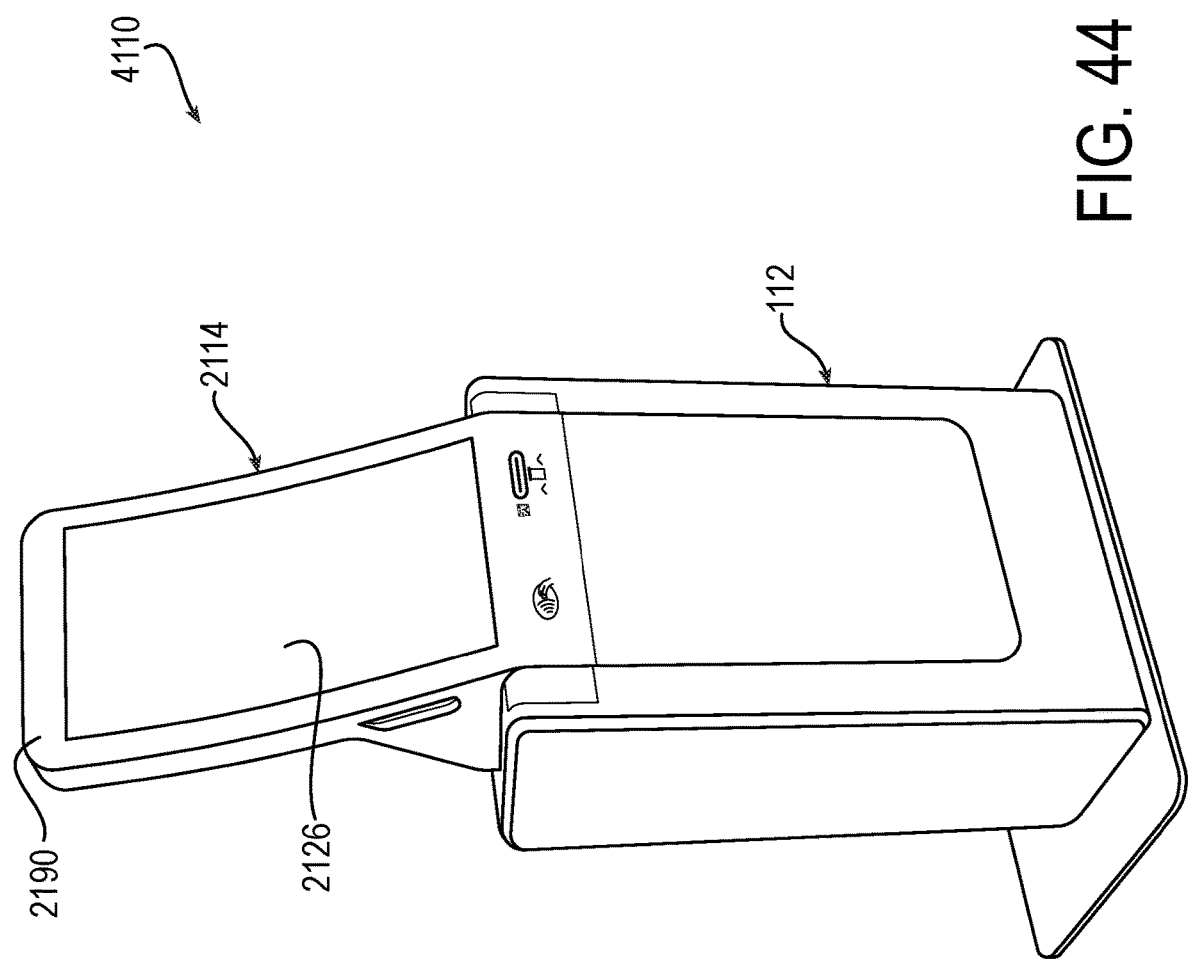
FIG. 44 is a perspective view of a seventh alternative embodiment of the present disclosure.
Figure 45:
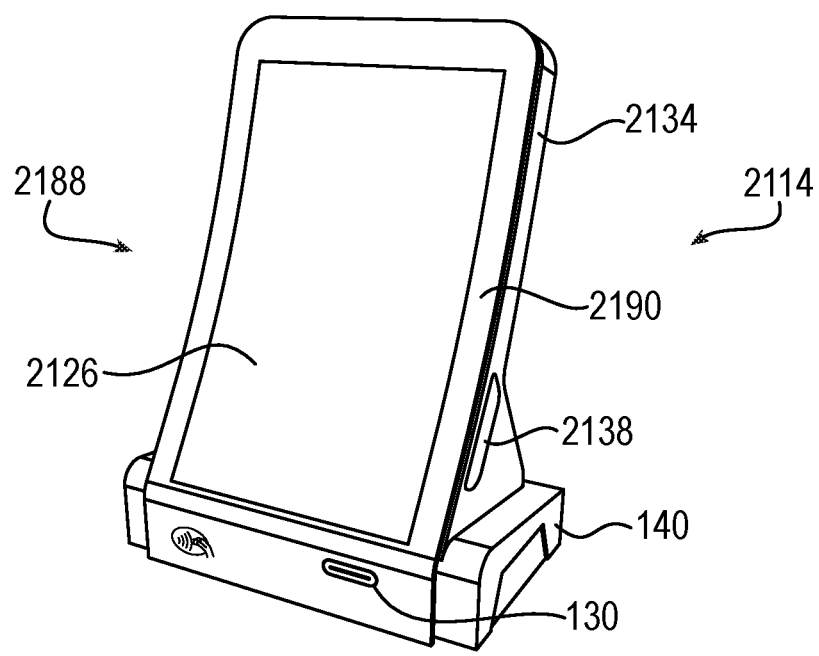
FIG. 45 is a front perspective view of a head module of the seventh alternative embodiment of the present disclosure, the head module having a curved screen.
Figure 46:
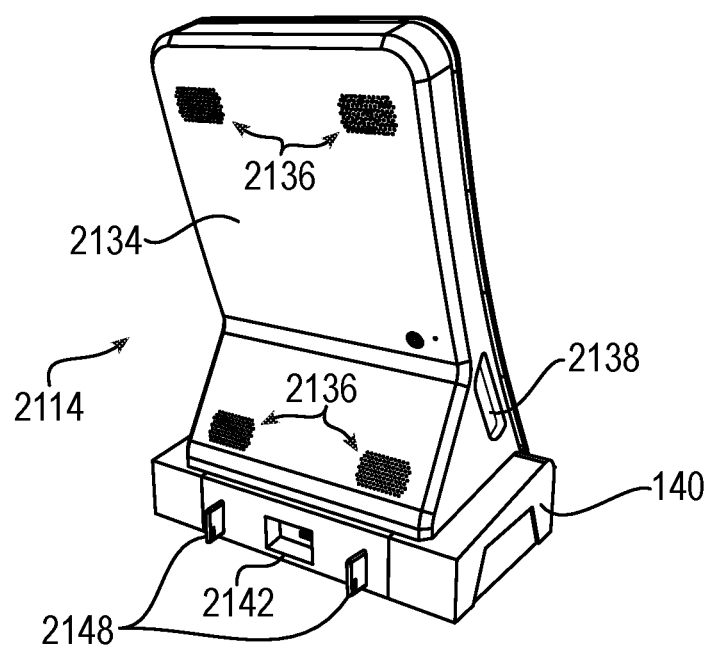
FIG. 46 is a rear perspective view of the head module of FIG. 45.
Figure 47:
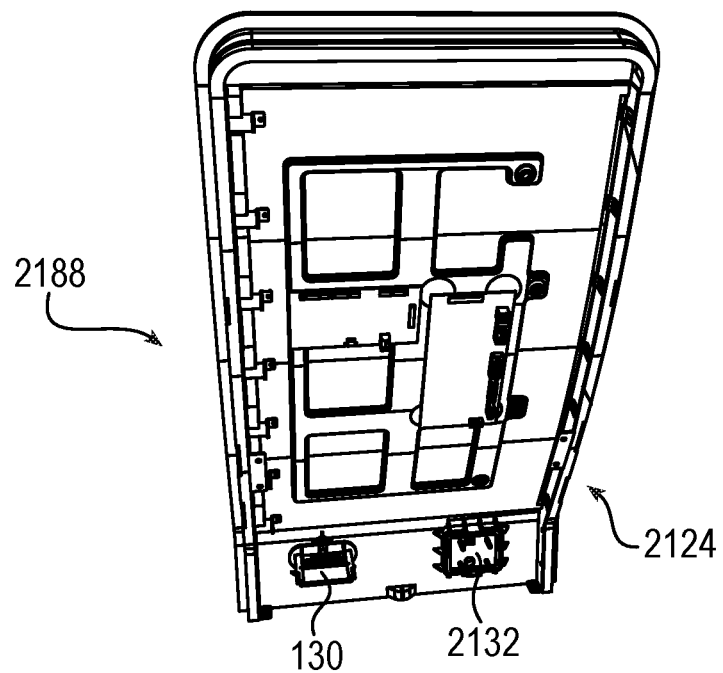
FIG. 47 is a rear perspective view of a fascia portion of a main structure for the head module of the seventh alternative embodiment of the present disclosure.
Figure 48:
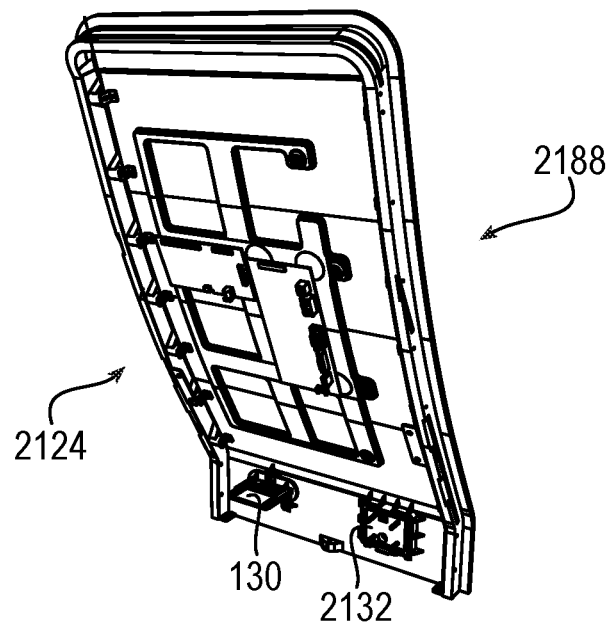
FIG. 48 is a side rear perspective view of the fascia portion shown in FIG. 47.
Figure 49:
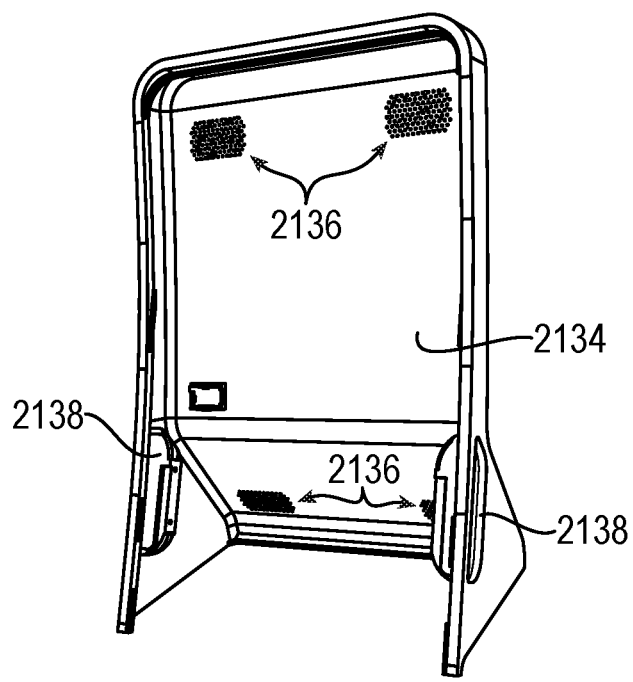
FIG. 49 is a front perspective view of the rear shroud of the seventh alternative embodiment of the present disclosure.
Figure 50:
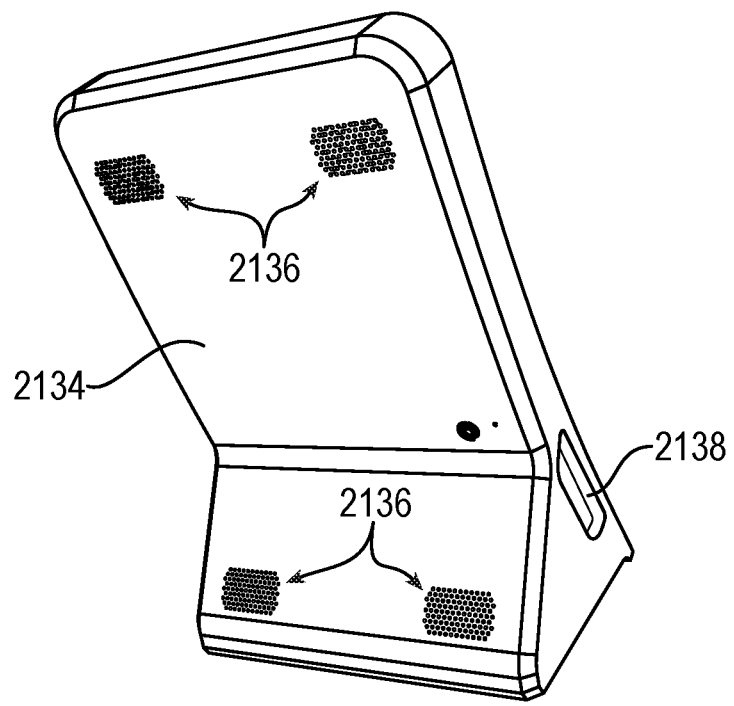
FIG. 50 is a rear perspective view of the rear shroud shown in FIG. 49.

Referring now to FIG. 43, in a sixth embodiment of the present disclosure, the ATM 2110 is paired with the at least one bank 116 of lockers 118 positioned adjacent to the cabinet module 112.

Referring now to FIG. 44-50, in a seventh embodiment of the present disclosure, an ATM 4110 includes a head module 2114 and the cabinet module 112. The head module 2114 and the cabinet module 112 releasibly interconnect with one another in the same way, using the same structures, as the head module 114 and the cabinet module 112. The exemplary head module 2114 includes a main structure 2124 defining a fascia portion 2188 with a fascia surface 2190. The fascia surface 2190 surrounds a user-interface 2126 in the form of a touch screen. The exemplary head module 214 also includes the physical card reader 130 and a non-contact card reader and/or a wireless communications device (e.g.

Bluetooth, Wi-Fi, Near Field Communication (NFC), and the like) for communication with a personal mobile device, referenced generally at 2132.

The exemplary main structure 2124 interconnects with a rear shroud 2134. The rear shroud 2134 includes optional vents 2136 to allow air flow through the head module 2114, and most preferably includes upper and lower vents to allow air flow along a longitudinal portion of the head module 2114. The rear shroud 2134 also defines first and second handles 2138 integrally formed into the rear shroud 2134 on opposite lateral sides. The head module 2114 also includes the base 140, which receives the rear shroud 2134.

Figure 51:
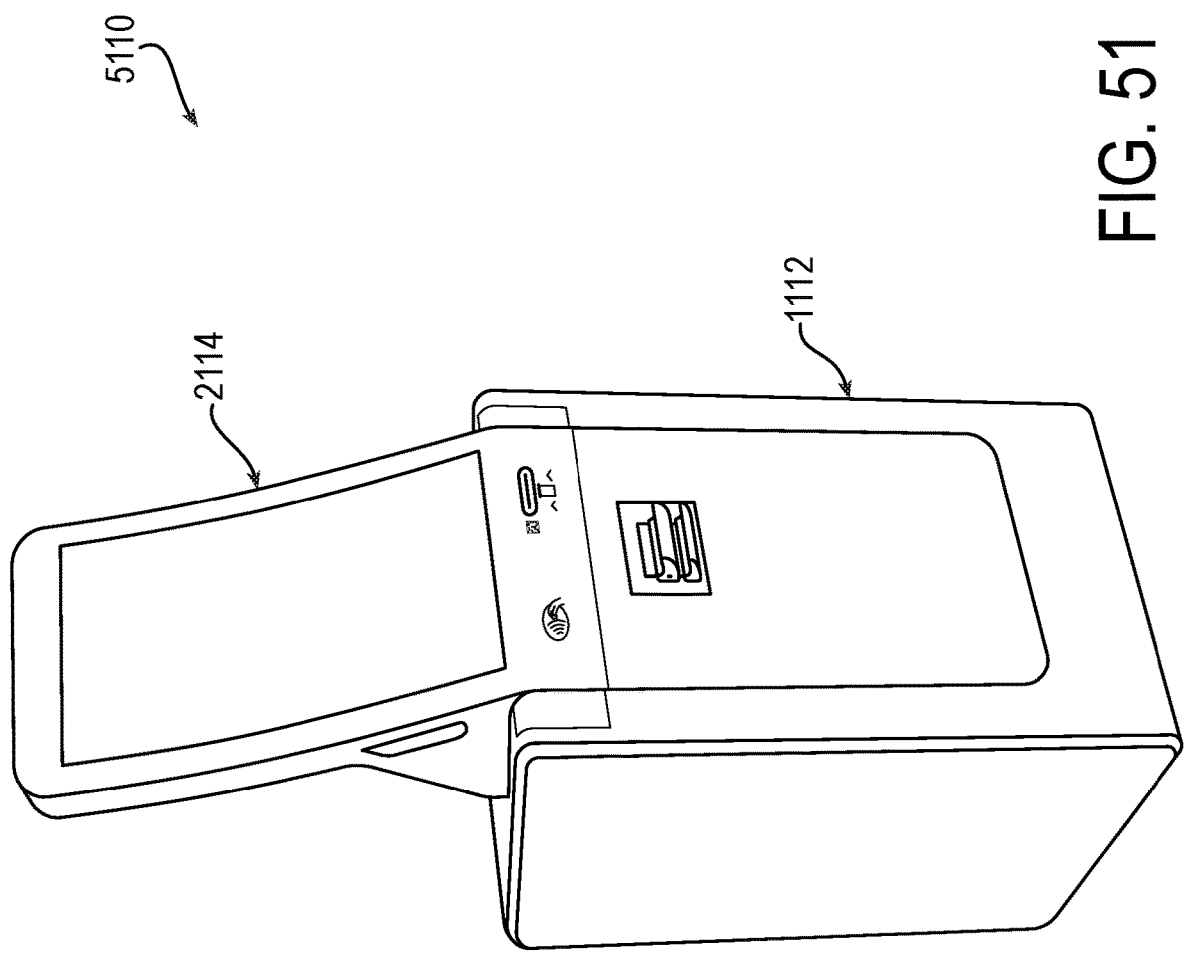
FIG. 51 is a perspective view of an eighth alternative embodiment of the present disclosure.

Referring now to FIG. 51, in an eighth embodiment of the present disclosure, an ATM 5110 includes the head module 2114 and the cabinet module 1112. The head module 2114 and the cabinet module 1112 releasibly interconnect with one another in the same way, using the same structures, as the head module 114 and the cabinet module 112.

Figure 52:
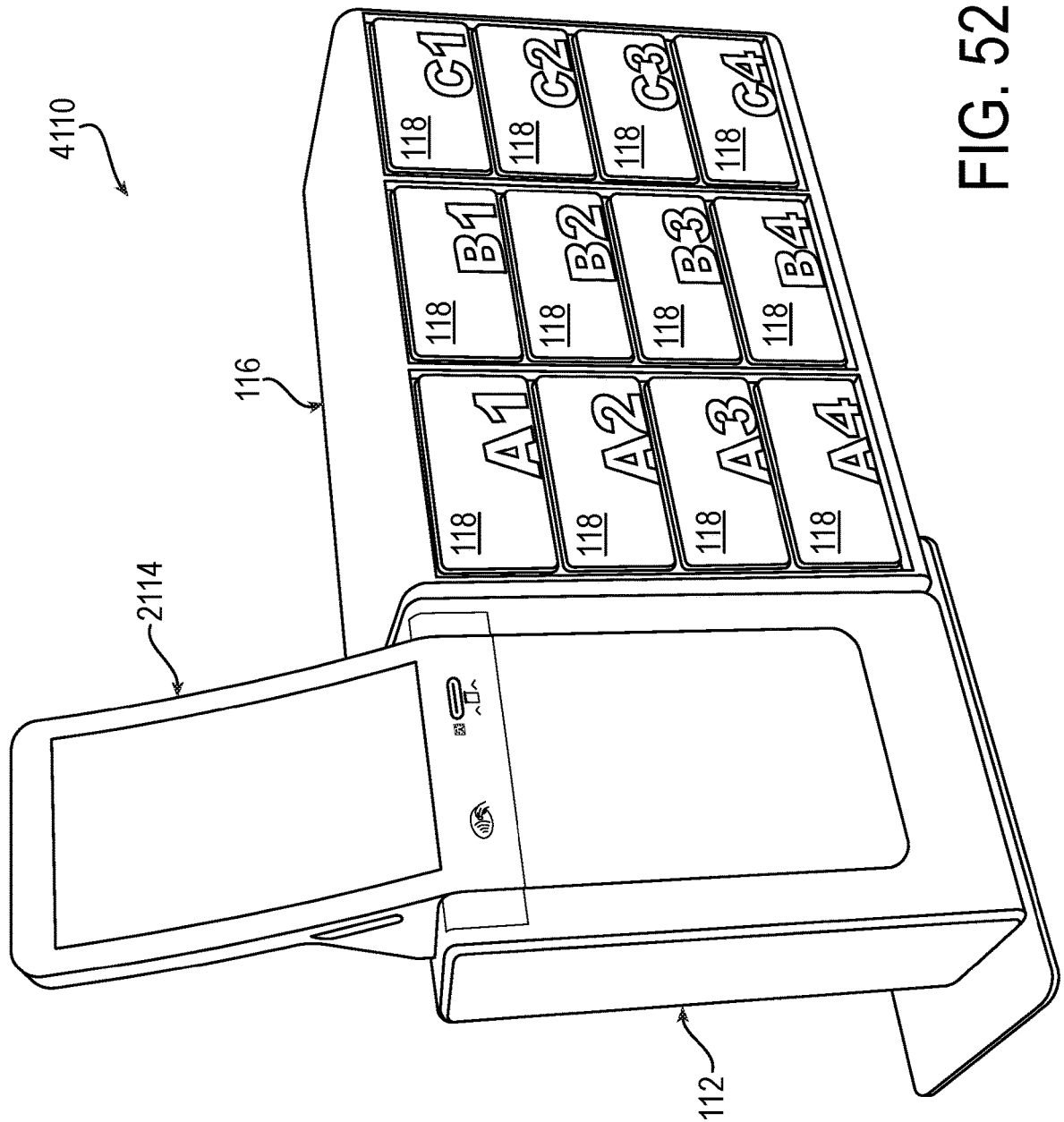
FIG. 52 is a perspective view of a ninth alternative embodiment of the present disclosure.

Referring now to FIG. 52, in a ninth embodiment of the present disclosure, the ATM 4110 is paired with the at least one bank 116 of lockers 118 positioned adjacent to the cabinet module 112.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or subcombinations that are disclosed herein is hereby unconditionally reserved. The use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. A modular automated transaction machine (ATM) comprising:
   a cabinet module including:
      an outer housing,
      a chest positioned in said outer housing and configured to store notes of value,
      a transport mechanism positioned in said outer housing, said transport mechanism engaged with said chest to move the notes of value out of said chest and direct the notes of value away from said chest,
      a base receiving section defined by a plurality of exterior surfaces of said outer housing, and
      a first electrical connector mounted in said base receiving section and forming an electrical connection to said transport mechanism;
   a head module removably engageable with said cabinet module and including:
      a computing device having one or more processors,
      at least one user-interface device controlled by said computing device,
      a main structure supporting said at least one user-interface device and said computing device,
      a rear shroud connected to the main structure to enclose a rear side of said at least one user-interface device and said computing device,
      a base supporting said main structure and said rear shroud, and
      a second electrical connector mounted in said base and forming an electrical connection to said computing device; and
   wherein, when said head module is engaged with said cabinet module, said base of said head module is positioned in said base receiving section between a first and second of said plurality of exterior surfaces that are parallel to one another and also said first electrical connector and said second electrical connector are interconnected whereby an electrical connection is established between said computing device and said transport mechanism.

2. The modular ATM of claim 1 further comprising at least one locking mechanism configured to lock said head module and said cabinet module together.

3. The modular ATM of claim 2 wherein said at least one locking mechanism comprises:
   at least one blade projecting rearwardly from said base parallel to said first and second of said plurality of exterior surfaces;
   at least one slot defined in a third of said plurality of exterior surfaces of said base receiving section, said third of said plurality of exterior surfaces normal to said first and second of said plurality of exterior surfaces, said at least one blade received in said at least one slot when said head module is engaged with said cabinet module; and
   at least one locking cylinder positioned in a wall of said outer housing and communicating with said at least one slot, said wall of said outer housing defining said third of said plurality of exterior surfaces, said at least one locking cylinder configured to selectively engage said at least one blade when said head module is engaged with said cabinet module.

4. The modular ATM of claim 3 wherein said at least one locking mechanism is further defined as a plurality of locking mechanisms:
   said at least one blade is further defined as a first blade and a second blade, each projecting rearwardly from said base parallel to said first and second of said plurality of exterior surfaces, said first blade and said second blade positioned on opposite sides of said second electrical connector;
   said at least one slot is further defined as a first slot and a second slot, each defined in said third of said plurality of exterior surfaces of said base receiving section, said first blade received in said first slot and said second blade received in said second slot when said head module is engaged with said cabinet module; and
   said at least one locking cylinder is further defined as a first locking cylinder and a second locking cylinder, each positioned in said wall of said outer housing and communicating with one of said first slot and said second slot, said first locking cylinder configured to selectively engage said first blade and said second locking cylinder configured to selectively engage said second blade when said head module is engaged with said cabinet module.

5. The modular ATM of claim 2 wherein the locking mechanism is configured to receive a key to be changed between a locked state and an unlocked state.

6. The modular ATM of claim 2 wherein:
said head module further comprises a transceiver configured to communicate using at least one of near field communication protocol and Bluetooth protocol, said transceiver communicating with said computing device; and
said locking mechanism further comprises:
an latch moveable between a first position engaging said at least one blade when said head module is engaged with said cabinet module and a second position spaced from said at least one blade, and
an actuator configured to move said latch between said first position and said second position, wherein said actuator is controlled by said computing device in response to communications received by said transceiver.

7. The modular ATM of claim 2 wherein said locking mechanism further comprises:
an latch moveable between a first position engaging said at least one blade when said head module is engaged with said cabinet module and a second position spaced from said first position; and
an actuator configured to move said latch between said first position and said second position, wherein said actuator is controlled by said computing device in response to inputs received through said at least one user-interface device.

8. The modular ATM of claim 2 wherein:
said head module further comprises a transceiver configured to place said computing device in communication with a wide area network; and
said locking mechanism further comprises:
an latch moveable between a first position engaging said at least one blade when said head module is engaged with said cabinet module and a second position spaced from said at least one blade, and
an actuator configured to move said latch between said first position and said second position, wherein said actuator is controlled by said computing device in response to communications received by said transceiver.

9. The modular ATM of claim 2 wherein:
said head module further comprises a transceiver configured to communicate using at least one of near field communication protocol, Bluetooth protocol, and a wide area network, said transceiver communicating with said computing device; and
said locking mechanism further comprises:
an latch moveable between a first position engaging said at least one blade when said head module is engaged with said cabinet module and a second position spaced from said at least one blade, and
an actuator configured to move said latch between said first position and said second position, wherein said actuator is controlled by said computing device in response one of communications received by said transceiver and inputs received through said at least one user-interface device; and
said head module further comprises a battery selectively supplying electrical power to said computing device and said at least one user-interface device and said actuator.

10. The modular ATM of claim 1 wherein said head module further comprises:

a battery selectively supplying electrical power to said computing device and said at least one user-interface device.

11. The modular ATM of claim 1 wherein electrical data signals and electrical power are communicated through said first electrical connector and said second electrical connector when said head module is engaged with said cabinet module.

12. The modular ATM of claim 1 wherein said plurality of exterior surfaces of said base receiving section further comprise:
a third exterior surface transverse to said first and second of said plurality of exterior surfaces; and
a fourth exterior surface traverse to said first and second of said plurality of exterior surfaces and traverse to said third exterior surface, and wherein, when said head module is being engaged with said cabinet module, said base of said head module is slid across said first and second of said plurality of exterior surfaces as well as said fourth exterior surface and said base of said head module rests on said fourth exterior surface when said head module is engaged with said cabinet module.

13. The modular ATM of claim 12 further comprising:
at least one locking pin projecting away from one of said fourth exterior surface in said base receiving section of said cabinet module and an underside of said base of said head module; and
at least one slot defined in the other of said fourth exterior surface in said base receiving section of said cabinet module and an underside of said base of said head module, wherein said at least one locking pin is received in said at least one slot when said head module is engaged with said cabinet module.

14. The modular ATM of claim 13 wherein:
said at least one slot is elongated and extends a length between first and second opposite ends;
said at least one locking pin is moveable along said length of said at least one slot when said at least one locking pin is positioned in said at least one slot; and
said base of said head module is slid across said first and second of said plurality of exterior surfaces as well as said fourth exterior surface until sliding movement until positively stopped by said at least one pin and one of said first and second ends coming into contact with one another.

15. The modular ATM of claim 14 wherein:
said at least one locking pin includes a head and a neck, said neck between said head and said one of said fourth exterior surface in said base receiving section of said cabinet module and an underside of said base of said head module, said neck narrower than said head; and
said at least one slot defines a variable width along said length, having a first width at said first end and a second width at said second end, said first width wider than said second width, said head receivable in said first end but not in said second end, said neck receivable in said at least one slot along all of said length, said head positioned at said second end when said head module is engaged with said cabinet module.

16. The modular ATM of claim 15 wherein said head is first positioned at said first end of said at least one slot when said head module is slid across said first and second of said plurality of exterior surfaces as well as said fourth exterior surface and reaches said second end of said at least one slot before said head module contacts said third exterior surface to protect said first electrical connector and said second electrical connector.

17. The modular ATM of claim 1 wherein said head module further comprises:
first and second handles integrally formed into said rear shroud and positioned on opposite lateral sides of said at least one user-interface device.

18. The modular ATM of claim 17 wherein said first and second handles are further defined as first and second recesses extending into said opposite lateral sides of said rear shroud, each of said first and second recesses having a length and width, said length larger than said width, said main structure defining a fascia portion with a surface extending around said at least one user-interface device, said length extending parallel to said surface of said fascia portion.

19. The modular ATM of claim 1 further comprising:
at least one bank of lockers positioned adjacent to said cabinet module, said at least one bank of lockers having a plurality of individual lockers, each of said plurality of individual lockers having a door and a lock configured to selectively lock said door, and wherein said locks of said at least one bank of lockers are controlled by said computing device, wherein said locks of said plurality of bank lockers are further defined as fully concealed within said at least one bank of lockers.

20. A system for forming a modular automated transaction machine (ATM) comprising:
a plurality of cabinet modules, each differently configured and each including:
an outer housing,
a chest positioned in said outer housing and configured to store notes of value,
a transport mechanism positioned in said outer housing, said transport mechanism engaged with said chest to move the notes of value out of said chest and direct the notes of value away from said chest,
a base receiving section defined by a plurality of exterior surfaces of said outer housing, and
a first electrical connector mounted in said base receiving section and forming an electrical connection to said transport mechanism;
a plurality of head modules, each differently shaped from one another and each removably engageable with any of said plurality of cabinet modules and each including:
a computing device having one or more processors,
at least one user-interface device controlled by said computing device,
a main structure supporting said at least one user-interface device and said computing device,
a rear shroud connected to the main structure to enclose a rear side of said at least one user-interface device and said computing device,
a base supporting said main structure and said rear shroud, and
a second electrical connector mounted in said base and forming an electrical connection to said computing device; and
wherein, when said head module is engaged with said cabinet module, said base of said head module is positioned in said base receiving section between a first and second of said plurality of exterior surfaces that are parallel to one another and also said first electrical connector and said second electrical connector are interconnected whereby an electrical connection is established between said computing device and said transport mechanism.

* * * * *